(12) United States Patent
Takada

(10) Patent No.: US 8,306,215 B2
(45) Date of Patent: Nov. 6, 2012

(54) ECHO CANCELLER FOR ELIMINATING ECHO WITHOUT BEING AFFECTED BY NOISE

(75) Inventor: Masashi Takada, Yokohama (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 173 days.

(21) Appl. No.: 12/926,902

(22) Filed: Dec. 16, 2010

(65) Prior Publication Data

US 2011/0150067 A1   Jun. 23, 2011

(30) Foreign Application Priority Data

Dec. 17, 2009   (JP) ................ 2009-286504

(51) Int. Cl.
*H04M 9/08* (2006.01)
(52) U.S. Cl. .............. 379/406.08; 379/406.03
(58) Field of Classification Search ........... 379/406.01, 379/406.02, 406.03, 406.06, 406.08
See application file for complete search history.

(56) References Cited

U.S. PATENT DOCUMENTS

| | | | |
|---|---|---|---|
| 6,181,753 B1 | 1/2001 | Takada et al. | |
| 2004/0170271 A1* | 9/2004 | Kubota | 379/406.01 |
| 2007/0041575 A1 | 2/2007 | Alves et al. | |
| 2009/0129584 A1* | 5/2009 | Aoyagi et al. | 379/406.06 |
| 2009/0245502 A1* | 10/2009 | Liu | 379/406.08 |
| 2009/0257579 A1* | 10/2009 | Takada | 379/406.08 |
| 2009/0291632 A1* | 11/2009 | Braithwaite et al. | 455/7 |
| 2010/0150376 A1* | 6/2010 | Itou | 381/94.1 |
| 2010/0184488 A1* | 7/2010 | Takada | 455/570 |
| 2011/0238417 A1* | 9/2011 | Yamamoto et al. | 704/233 |
| 2011/0261950 A1* | 10/2011 | Yamaguchi | 379/406.08 |
| 2012/0051411 A1* | 3/2012 | Duron et al. | 375/224 |
| 2012/0063609 A1* | 3/2012 | Triki et al. | 381/66 |
| 2012/0155666 A1* | 6/2012 | Nair | 381/71.6 |
| 2012/0155667 A1* | 6/2012 | Nair | 381/71.6 |

FOREIGN PATENT DOCUMENTS

| | | |
|---|---|---|
| JP | 08-237174 A | 9/1996 |
| JP | 2105375 | 11/1996 |
| JP | 2007-052150 A | 3/2007 |
| JP | 2008-312199 A | 12/2008 |

OTHER PUBLICATIONS

Ryuichi Oka et al., "A Method Steadily Reducing Acoustic Echo against Double-Talk" IEICE (The Institute of Electronics, Information and Communication Engineers) Tech. Rep., vol. 108, No. 69, EA2008-21, pp. 19-26, May 2008.
The website of Ono Sokki, http://www.onosokki.co.jp/HP-WK/c_support/newreport/soundquality/soundquality_2.htm, searched for on Jan. 31, 2009.

* cited by examiner

*Primary Examiner* — Olisa Anwah
(74) *Attorney, Agent, or Firm* — Rabin & Berdo, P.C.

(57) ABSTRACT

In an echo canceller, a specific frequency component eliminator eliminates a specific frequency component of a specific frequency from a receiver signal to output a resultant signal to an echo path. A specific frequency component detector detects a frequency component of the same frequency as the specific frequency eliminated by the specific frequency component eliminator from the transmitter signal. A noise calculator finds noise power on the basis of power of the specific frequency component detected by the specific frequency component detector, and finds total power including noise and an echo component on the basis of power of a frequency component including the echo component. A control parameter calculator uses the noise power and the total power found by the noise calculator to find a control parameter of the echo canceller.

20 Claims, 20 Drawing Sheets

FREQ CHARACTERISTIC OF
LOUDSPEAKER OUTPUT

FREQ CHARACTERISTIC
OF NEAR END NOISE

TOTAL SIGNAL OF
ECHO AND NOISE

CALCULATION OF NEAR
END NOISE POWER

ECHO LEVEL ESTIMATION

CALCULATION OF MAX
COMPONENT Psn_max

FIG. 17

| OUTPUTTING SIGNAL SON | DESIGNATED OUTPUT FREQ [kHz] |
|---|---|
| FIRST (INITIAL VALUE) $\omega 1$ | 1.0 |
| SECOND $\omega 2$ | 2.0 |
| THIRD $\omega 3$ | 3.0 |
| FOURTH $\omega 4$ | 1.0 (RETURN TO INITIAL VALUE) |
| FIFTH $\omega 5$ | 2.0 |
| SIXTH $\omega 6$ | 3.0 |
| ... | ... |

ECHO CANCELLER FOR ELIMINATING ECHO WITHOUT BEING AFFECTED BY NOISE

BACKGROUND OF THE INVENTION

1. Field of the Invention

The present invention relates to an echo canceller, and more particularly to an echo canceller applicable to, for example, a telephone apparatus for use in conference telephone or hands-free telephone.

2. Description of the Background Art

Conventionally, the echo canceller has its basis of operation on the assumption that an echo path it can estimate is linear time-invariant. Additionally, the echo canceller is adapted to proceed to convergence, when observing only an echo and a signal in question causing the echo, to thereby allow an actual echo path to be estimated to cancel the echo.

However, in a practical environment in which an apparatus equipped with the echo canceller is placed, a double talk may often occur in which a near end and a far end talker speak at the same time, background noise may be caused at a near end, or particularly with an acoustic echo canceller an echo path may often change. Therefore, adaptation for the echo canceller without any countermeasures thereagainst may cause its adaptive filter to diverge so as to cause howling.

The echo canceller is required to have not only theoretical aspects such as a rate of convergence and accuracy of estimation by advanced algorithm but also countermeasures on practical side for ensuring the robust stability in speech quality even under such practical conditions.

Typically, for example, as disclosed in Japanese Patent No. 2105375, the power of a received signal and an output signal of the echo canceller is used to detect a double-talking and a silent section.

However, such solutions based on detecting a change in power cannot distinguish an increase in signal power of the near end talker or power of near end background noise from an increase in echo power caused by a change in echo path, as is problematic. This problem leads to significantly serious disadvantage.

The reason for this is that the adaptive filter in the echo canceller needs to stop updating its coefficient in the case of double talk or an increase in near end background noise, whereas the adaptive filter has to accelerate update of the coefficient in the case of a variation in echo path. In other words, although both cases appear as the same phenomenon where the signal power (on an input or an output of an echo cancel adder) increases, both cases have to be controlled in the ways opposite to each other. Therefore, erroneous control over inappropriate one of these cases would lead to fatally deteriorating communication quality.

On the other hand, background noise on the near end talker side may often be treated from a viewpoint of improving naturalness of an auditory feeling of the far end talker rather than performance of the echo canceller. That type of solutions is exemplified by Japanese Patent Laid-Open Publication No. 2007-52150 and U.S. Pat. No. 6,181,753 to Takada et al., in which an echo canceller eliminates an echo and thereafter cancels a noise cancel from the signal. These solutions disclosed in the Japanese '150 Publication and Takada et al., cancel a noise after eliminating an echo because of the fact that the noise cancelling may often be nonlinear processing on the signal. That is also resultant from preventing the echo canceller from deteriorating in performance otherwise caused by nonlinearly of the echo path.

However, since these solutions do not contribute to the improvement of performance of the echo canceller, they are directly affected by the deterioration in performance of the echo canceller canceling the echo.

Moreover, disadvantageously, in the case of the background noise mixed with the echo as described above, the echo canceller can only eliminate the echo to the extent of the level of the near end noise at most. Such mutual reaction between both echo canceller and noise canceller may often result in failing to sufficiently attain the performance of thereof.

One typical solution for preventing performance of the echo canceller from deteriorating due to the near end noise is known as decreasing a step gain of the adaptive filter.

The step gain is a parameter for controlling the rate of convergence of the echo canceller. When the step gain is larger, the echo canceller converges more rapidly but is more sensitive to noise. When the step gain is smaller, the echo canceller can more effectively be prevented from being affected by noise but converges more slowly.

Japanese Patent Laid-Open Publication No. 237174/1996 discloses a solution for increasing a step gain at the start of operation of the device and gradually decreasing the step gain for a predetermined period from the start of the operation to thereby prevent an effect on a convergence period and noise to obtain the accuracy of the convergence.

However, since the control for decreasing the step gain is not always accurately related to the state of convergence of the echo canceller, the step gain may decrease even though the adaptive filter does not yet sufficiently converge. That may cause the convergence of the adaptive filter to interrupt.

In contrast to this, superior solutions for reflecting even the state of operation environment in which the echo canceller is placed to control a step gain to thereby facilitate the convergence of an adaptive filter are disclosed in Ryuichi Oka, et al., "A Method Steadily Reducing Acoustic Echo against Double-Talk" IEICE (The Institute of Electronics, Information and Communication Engineers) Tech. Rep., vol. 108, no. 69, EA2008-21, pp. 19-26, May 2008, and Japanese Patent Laid-Open Publication No. 2008-312199 and U.S. Patent Application Publication No. US 2007/0041575 A1 to Alves et al.

However, the solutions described in Ryuichi Oka, et al., and the Japanese '199 Publication and Alves et al., use a sub adaptive filter in order to distinguish an increase in power of a transmitted signal due to a variation in echo path and an increase in transmitted signal due to an increase in background noise or a double-talk signal, thereby estimating the power of near end noise.

The sub adaptive filter for use in the solutions described in Ryuichi Oka, et al., and the Japanese '199 Publication and Alves et al., is a sort of small echo canceller, which has the same essential problem as an adaptive filter. Ultimately as a result, the control of the step gain by the echo canceller significantly depends on the performance of the sub adaptive filter. That may significantly deteriorate the performance depending on acoustic background at a near end.

Particularly, these sub adaptive filters need a premise that the near end noise is not correlated with a far end signal, but this premise is not true in, for example, an office environment including an audio signal having the near end noise in itself significantly correlated with a far end signal, thereby causing a large error in output of the sub adaptive filter.

As a result, due to an inappropriate estimation on the effect of the near end noise signal, the step gain is rendered more excessive than necessary to cause the adaptation operation of the echo canceller to be unnecessarily sensitive to increase an error in entire output of the echo canceller. Thus, it is extremely difficult to prevent the performance from deteriorating due to the effect of the near end noise and a variation in echo path.

SUMMARY OF THE INVENTION

It is therefore an object of the present invention to provide an improved echo canceller capable of correctly detecting a noise environment and a variation in echo path as a near end acoustic environment to eliminate an echo depending on a situation.

It is another object of the present invention to provide such an improved echo canceller for eliminating an echo without being affected by malfunction due to deterioration in performance of a sub adaptive filter or the like for use in controlling the echo canceller.

In accordance with the present invention, an echo canceller including a pseudo echo generator for using an adaptive filter on the basis of a receiver signal to generate a pseudo echo signal, and an echo eliminator for using the pseudo echo signal to eliminate an echo component from a transmitter signal includes: a specific frequency component eliminator for eliminating a specific frequency component of a specific frequency from the receiver signal to output a resultant signal to an echo path; a specific frequency component detector for detecting a frequency component of the same frequency as the specific frequency eliminated by the specific frequency component eliminator from the transmitter signal; a noise calculator for finding noise power on the basis of power of the specific frequency component detected by the specific frequency component detector, and finding total power including noise and an echo component on the basis of power of a frequency component including the echo component; and a control parameter calculator for using the noise power and the total power found by the noise calculator to find a control parameter of the echo canceller.

In accordance with the present invention, an echo canceller can correctly detect a noise environment and a variation in echo path as a near end acoustic environment to eliminate an echo depending on a situation without being affected by malfunctions due to deterioration in performance of a sub adaptive filter or the like for use in controlling the echo canceller.

BRIEF DESCRIPTION OF THE DRAWINGS

The objects and features of the present invention will become more apparent from consideration of the following detailed description taken in conjunction with the accompanying drawings in which:

FIG. 17 shows how to determine a frequency by the frequency determiner of the fourth embodiment;

DESCRIPTION OF THE PREFERRED EMBODIMENTS (A) First Embodiment

Well, reference will be made to accompanying drawings to describe an echo canceller in accordance with the first preferred embodiment of the present invention. The first embodiment will be described to take an exemplified case where the invention is applied to an echo canceller provided with an adaptive filter for canceling out an echo in a telephone apparatus such as conference telephone and hands-free telephone.

The echo canceller of the first embodiment may be constituted as, for example, a customized board or implemented by a DSP (Digital Signal Processor) having an echo cancel program stored or by a CPU (Central Processor Unit) and software to be executed by the CPU. In any cases, however, its functions can be illustrated as shown in FIG. 1.

The illustrative embodiment of the echo canceller is thus depicted and described as configured by separate functional blocks. It is however to be noted that such a depiction and a description do not restrict the echo canceller to an implementation only in the form of hardware but the echo canceller may partially or entirely be implemented by software, namely, by such a processor system, which has a computer program installed and functions, when executing the computer program, as part of, or the entirety of, the echo canceller. That may also be the case with illustrative embodiments which will be described below. In this connection, the word "circuit" or "section" may be understood not only as hardware, such as an electronics circuit, but also as a function that may be implemented by software installed and executed on a processor system.

Figure 1:
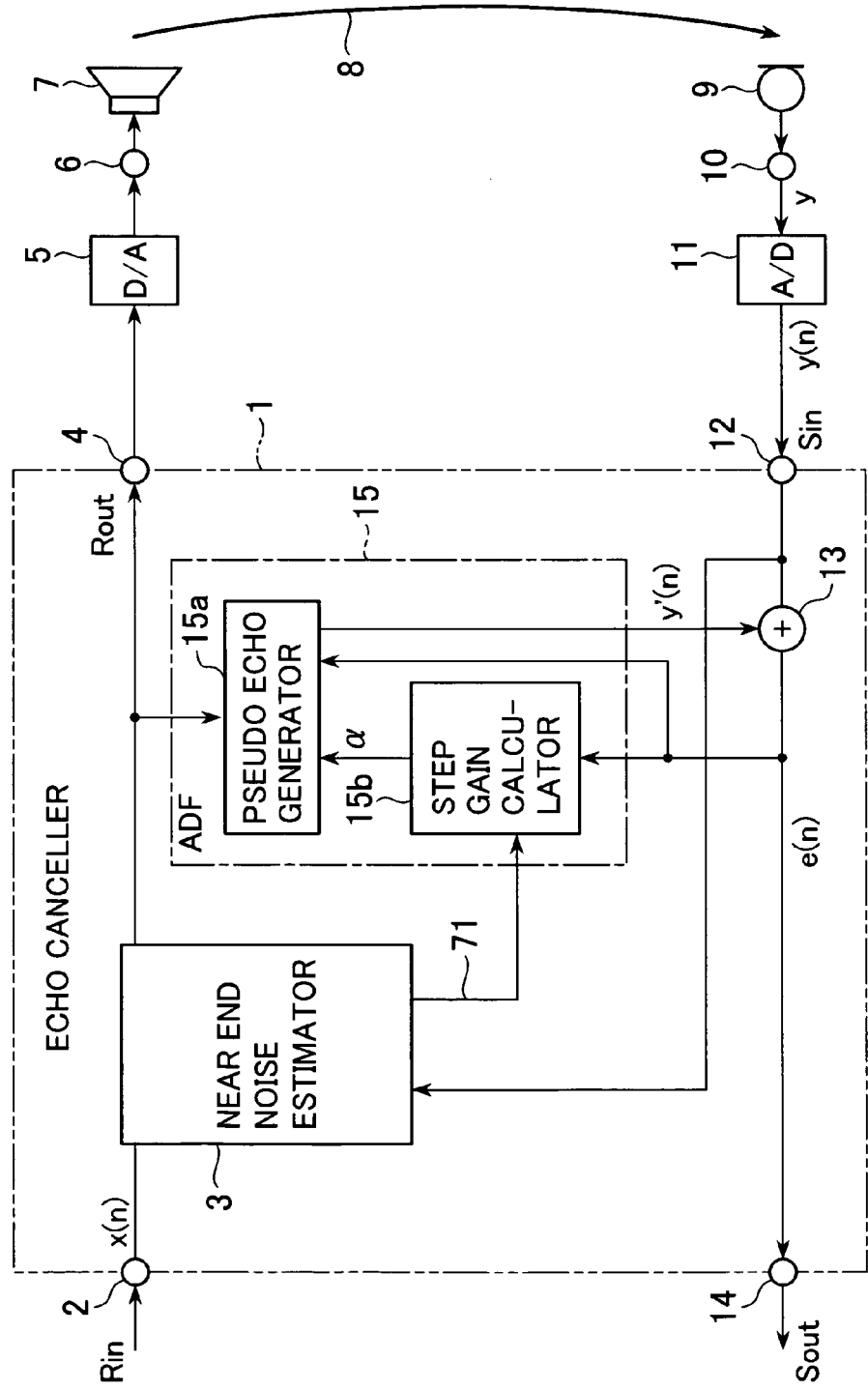
FIG. 1 is a schematic block diagram showing the configuration of an echo canceller and its peripheral components of a first embodiment.

In FIG. 1, the echo canceller 1 in accordance with the first illustrative embodiment is shown with its left and right sides directed to far-end and near-end talkers or listeners, not shown, respectively. It is to be noted that talkers could be listeners when appropriate. In the context, therefore, the term "talker" may be understood as a listener when listening to audible sound, such as voice.

As seen from the figure, the echo canceller 1 of the first embodiment includes at least a receiver input terminal, Rin, 2, a near end noise estimator 3, a receiver output terminal, Rout, 4, a transmitter input terminal, Sin, 12, an echo cancel adder 13, a transmitter output terminal, Sout, 14, and an adaptive filter (ADF) 15 including a pseudo echo generator 15a and a step gain calculator 15b, which are interconnected as depicted. Thus, signals are designated by reference numerals or letters of connections conveying signals. Elements or portions not directly relevant to understanding the present invention will neither be described nor shown. In the following, like components and elements are designated with identical reference numerals and repetitive descriptions thereon will be omitted.

The peripheral components of the echo canceller 1 includes, as shown in FIG. 1, at least a digital-to-analog (D/A) converter 5 connected to the receiver output terminal (Rout) 4 of the echo canceller 1, a loudspeaker input terminal 6, a loudspeaker 7, a microphone 9, a microphone output terminal 10, and an analog-to-digital (A/D) converter 11 connected to the transmitter input terminal (Sin) 12 of the echo canceller 1.

The receiver input terminal (Rin) 2 is connected to receive a signal arriving from the far end talker, not shown, and transfer the received audio signal x(n) to the near end noise estimator 3. Now, the audio signal x(n) is a digital audio signal obtained by a decoder, not shown, decoding a received signal inputted from the receiver input terminal Rin 2.

The near end noise estimator 3 is adapted to receive the audio signal x(n) inputted from the receiver input terminal 2 and a digital signal y(n) inputted from the transmitter input terminal (Sin) 12, and estimate a near end background noise, which may sometimes be simply referred to as near end noise, as a signal generated at a near end side other than the echo in a signal inputted to the microphone 9 in an estimation scheme described below.

The near end noise estimator 3 is, although its processing will be described in detail later on, adapted to output to the receiver output terminal 4 a signal (reference signal) obtained by periodically eliminating a specific frequency component in the inputted audio signal x(n) on a receiver side path. On the other hand, on a transmitter path side, the near end noise estimator 3 is adapted to extract a specific frequency component having the same frequency as the above-described frequency in a signal inputted from the transmitter input terminal 12, and calculate the power of the specific frequency component to thereby estimate the near end noise. Furthermore, the near end noise estimator 3 sends the calculated power value to the step gain calculator 15b of the adaptive filter 15.

The adaptive filter 15 is adapted to receive the audio signal x(n) and the output signal e(n) outputted from the echo cancel adder 13, update a coefficient of the adaptive filter so as to minimize the power of the output signal e(n) in a scheme described below to generate a pseudo echo signal y'(n), and send the pseudo echo signal y'(n) to the echo cancel adder 13.

Now, in the adaptive filter 15, the pseudo echo signal y'(n) can be generated in any of various schemes that can minimize the power of e(n). For example, coefficient update algorithm such as the leaning identification method can be applied.

The receiver output terminal (Rout) 4 is connected to output the reference signal based on x(n) from the near end noise estimator 3 to the digital-to-analog converter 5.

The digital-to-analog converter 5 is adapted to convert the reference signal outputted from the receiver output terminal 4 to a corresponding analog signal to output the analog signal on the loudspeaker terminal 6 to the loudspeaker 7.

The loudspeaker 7 functions as transducing an analog audio signal on the loudspeaker terminal 6 to an audible sound.

The microphone 9 functions as capturing sound around the near end talker and sends an electric signal representing the captured sound through the microphone terminal 10 to the analog-to-digital converter 11. Part of the audible sound emitted from the loudspeaker 7 to the air may be captured by the microphone 9 as an echo component y over an acoustic echo path, which is conceptually depicted with a solid line 8. This echo component y captured by the microphone 9 is also sent through the microphone terminal 10 to the analog-to-digital converter 11.

The analog-to-digital converter 11 functions as converting the echo component y inputted through the microphone terminal 10 to a corresponding digital signal y(n) to send the digital signal to the transmitter input terminal (Sin) 12.

The transmitter input terminal (Sin) 12 is connected to receive the digital signal y(n) from the analog-to-digital converter 11 and sends the digital signal y(n) to the near end noise estimator 3 and the echo cancel adder 13.

The echo cancel adder 13 is adapted for receiving the digital signal y(n) on the transmitter input terminal 12 and the pseudo echo signal y'(n) from the adaptive filter 15 to cancel the digital signal y(n) with the pseudo echo signal y'(n), where n is a natural number representing the order of data sampled at a discrete time interval. The echo cancel adder 13 outputs the output signal e(n) to be fed back to the adaptive filter 15.

The transmitter output terminal (Sout) 14 is connected to output an output signal of the echo cancel adder 13 in the form of encoded signal, which is encoded by an encoder, not shown, and will be transmitted toward the far end listener.

Reverence will now be made to FIG. 2 to describe in detail the internal configuration of the near end noise estimator 3. In the figure, the near end noise estimator 3 includes at least a specific frequency interrupter 17, a voice activity detector (VAD) 19, a timing controller 1a, a near end noise calculator 1b, and a specific frequency waveform restorer 18, which are interconnected as illustrated.

The voice activity detector (VAD) 19 serves as detecting whether or not a signal inputted from the receiver input terminal 2 includes a voiced component, i.e. voice activity. The voice activity detector 19 outputs, when detecting the voice activity, a voice activity detection signal v to the timing controller 1a.

The timing controller 1a is adapted to be responsive to the voice activity detection signal v received from the voice activity detector 19 to provide a switch 177 of the specific frequency interrupter 17, which will be described later, with a signal controlling the switch 177 so as to turn the latter on or off. With the first embodiment, that signal may be, for example, a timing signal SON turning the switch 177 on. It will be described in detail later on how the timing controller 1a controls timing.

The specific frequency interrupter 17 is adapted to periodically eliminate only specific one of the frequency components of the audio signal x(n) inputted from the receiver input terminal 2 in a scheme to produce a reference signal x_ref(n) having the specific frequency component periodically interrupted on the receiver output terminal 4.

Now, in order to eliminate the specific frequency component by the specific frequency interrupter 17, a scheme relying upon the frequency masking effect can be applied such as not to bring an uncomfortable feeling to the near end listener. Such a scheme may be available on a website, http://www.onosokki.co.jp/HP-WK/c_support/newreport/soundquality/soundquality_2.htm, for example. The frequency masking effect is known as a phenomenon where a frequency component adjacent to another frequency component stronger in human auditory sense is caused to be masked so as not to be audible. The concepts and a specific example of processing by using the frequency masking effect will be described in detail later on.

Figure 2:
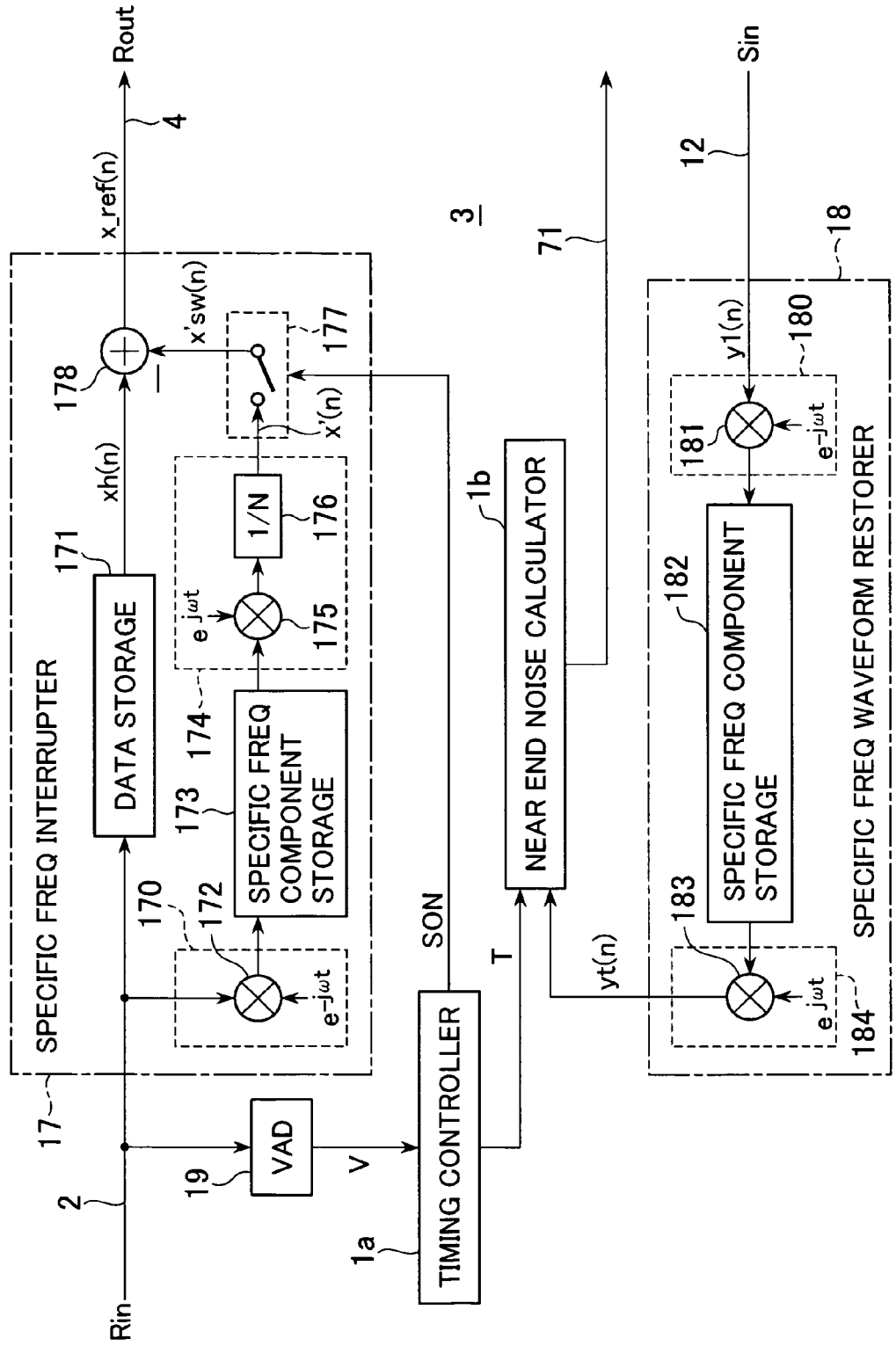
FIG. 2 is a schematic block diagram showing the internal configuration of the near end noise estimator of the first embodiment.

Specifically as shown in FIG. 2, the specific frequency interrupter 17 includes, in addition to the switch 177, at least a receiver side time-to-frequency converter 170 including a receiver side single component digital Fourier transformer (DFT) 172, a data storage 171, a receiver side specific frequency component storage 173, a receiver side frequency-to-time converter 174 including a receiver side single component inverse digital Fourier transformer 175 and a normalizer 176, and a component cancel adder 178, which are interconnected as depicted.

The specific frequency waveform restorer 18 serves as extracting such specific one of the frequency components of the digital signal y(n) inputted from the transmitter input terminal 12 which corresponds to the frequency component eliminated by the specific frequency interrupter 17.

As seen from FIG. 2, the specific frequency waveform restorer 18 includes at least a transmitter side time-to-frequency converter 180, a transmitter side single component digital Fourier transformer 181, a transmitter side specific frequency component storage 182, a transmitter side frequency-to-time converter 184, and a transmitter side single component inverse digital Fourier transformer 183, which are interconnected as illustrated.

The near end noise calculator 1b functions as receiving the extracted specific frequency component from the specific frequency waveform restorer 18 and calculating the power of the signal during a predetermined period of time in response to a timing signal T periodically provided from the timing controller 1a at a predetermined time interval. It will be described in detail later on how the near end noise calculator 1b calculates the power of the near end noise.

In operation, with reference to FIG. 1, the audio signal arriving from the far end talker side is inputted to the receiver input terminal Rin 2. The audio signal inputted to the receiver input terminal 2 is decoded by the decoder, not shown. Then, the decoded digital audio signal x(n) is sent to the near end noise estimator 3, the adaptive filter 15, and the receiver output terminal 4.

The audio signal x(n) outputted from the receiver output terminal 4 is inputted to the digital-to-analog converter 5 and is analog-converted by the converter 5. The analog audio signal is outputted to the loudspeaker terminal 6 of the loudspeaker 7.

The loudspeaker 7 transduces the audio signal to corresponding audible sound, which is emanated to the air. The audible sound emitted from the loudspeaker 7 to the air is partially caught by the microphone 9 an echo component y over an acoustic echo path 8.

The echo component y captured by the microphone 9 is inputted through the microphone terminal 10 to the analog-to-digital converter 11 and is digital-converted by the analog-to-digital converter 11. Then, the digital signal y(n) is outputted on the transmitter input terminal 12.

The digital signal y(n) inputted on the transmitter input terminal 12 is conveyed to the near end noise estimator 3 and the echo cancel adder 13.

The echo cancel adder 13 cancels the digital signal y(n) with the pseudo echo signal y'(n) provided from the adaptive filter 15 and outputs a residual signal e(n), which will be fed back to the adaptive filter 15.

The adaptive filter 15 receives the audio signal x(n) and the residual output e(n), updates its filter coefficient so as to minimize the power of the residual signal e(n) in a manner described below, and produces the pseudo echo signal y'(n) to the echo cancel adder 13.

Additionally, the output signal from the echo cancel adder 13 is outputted to the transmitter output terminal 14 and is encoded by the encoder, not shown, to be transmitted toward the far end talker or listener.

The near end noise estimator 3 receives the audio signal x(n) and the digital signal y(n), estimates the near end background noise that is generated at the near end but is other than the echo in the signal captured by the microphone 9, and outputs a result 71 of the estimation to the step gain calculator 15b of the adaptive filter 15.

Next, it will be described in detail how to estimate the near end background noise in the near end noise estimator 3. With reference to FIG. 2, the audio signal x(n) inputted from the receiver input terminal 2 is transferred to the voice activity detector (VAD) 19 and the specific frequency interrupter 17.

The VAD 19 determines whether or not the inputted signal includes voice activity, and produces a voice activity signal when detected. In turn, the VAD 19 outputs the voice activity detection signal v to the timing controller 1a.

Now, an example of detecting the voice activity signal in the VAD 19 will be described. For example, the VAD 19 calculates the absolute value |x(n)| of x(n), calculates the short-term average x_Short(k) and the long-term average x_long(k) of |x(n)| according to expressions (1) and (2), and determines that the voice activity exists when the condition of an expression (3) is satisfied.

$$x\_short(k) = (1.0 - \delta_s) \cdot x\_short(k-1) + \delta_s \cdot |x(n)| \quad (1)$$

$$x\_long(k) = (1.0 - \delta_l) \cdot x\_long(k-1) + \delta_l \cdot |x(n)|, \quad (2)$$

where $0 < \delta s \leq 1.0$ and $0 < \delta l \leq 1.0$.
Condition 1 is $$x\_short(k) \geq x\_long(k) + VAD\_m \quad (3)$$

Now, δs and δl are constants defining a response rate of averaging, where l is a lower-case letter of L. When δs and δl are larger, the averaging sensitively responds to a temporal variation but is readily affected by background noise. Inversely, when they are smaller, the averaging primarily follows a larger, or general, temporal variation and is unsusceptible to smaller, or trivial, noise. In the first embodiment, for example, δs is a constant corresponding to time of 20 ms, δl is a constant corresponding to time of 5 sec, and VAD_m is a value corresponding to 6 dB. However, values of δs, δl, and VAD_m are not restricted to those examples.

Additionally, the expression (3) defining a condition for determining that the voice activity exists may also be expressed normally, instead of dB notation, as follows with the same effect. Meanwhile, the value of VAD_mlin is set to, for example, 2.0.

$$x\_short(k) \geqq x\_long(k) \times VAD\_mlin \quad (3a)$$

The VAD 19 of the first embodiment is exemplarily adapted to detect the voice activity as described above. However, various manners capable of detecting voice activity in a signal can be applied without being restricted to the above-described manner.

On the other hand, the audio signal x(n) from the receiver input terminal 2 is inputted to the specific frequency interrupter 17. The timing controller 1a turns on or off the switch 177 of the specific frequency interrupter 17 at a timing described below.

The audio signal x(n) inputted to the specific frequency interrupter 17 is sent to the data storage 171 and the receiver side time-to-frequency converter 170.

In the receiver side time-to-frequency converter 170, the DFT transformer 172 extracts only the predetermined one of the frequency components of x(n) in, for example, a manner described below.

Now, for facilitating the understanding how to extract a single component and interrupt the component, the normal digital Fourier transform (DFT) will be first described rather than with respect to a single component.

Digital Fourier transform has been already a known solution for use in many kinds of signal processing and is the most familiar manner for converting a signal on the time axis to a spectrum on the frequency axis. Digital Fourier transform for converting a waveform on the time axis to frequency components is represented as a known expression (4). Inversely, a manner for converting a spectrum on the frequency axis to a signal on the time axis is inverse digital Fourier transform that is represented as a known expression (5).

$$X(m) = \sum_{k=0}^{N-1} x(k)\exp(-j2\pi km/N), \quad (4)$$
where $m = 0, 1, \ldots, N-1$.

$$x(n) = \frac{1}{N}\sum_{m=0}^{N-1} X(m)\exp(j2\pi nm/N), \quad (5)$$
where $n = 0, 1, \ldots, N-1$.

The right-hand side of the expression (4) represents that the m-th frequency component on the frequency axis can be found from a waveform on the time axis. The expression (5) represents that the n-th sample on the time axis can be calculated from combination of the frequency components in the right-hand side. Now, the lower-case letter j represents an imaginary unit of a complex number. A coefficient of 1/N in the expression (5) is such a constant that the original waveform on the time axis is reproduced in the inverse transform. For example, in FIG. 2, the normalizer 176 implements this function. In the example of the first embodiment, only the expression (5) includes a divisor. However, it is known that the transform between the axes in the expressions (4) and (5) is revertible. Therefore, both digital Fourier transform and inverse digital Fourier transform may also include a multiplier factor of $1/\sqrt{N}$.

In the first illustrative embodiment, a frequency component of, for example, 1.6 kHz is extracted as the single frequency component, which is not restrictive.

As is known, since the above-described transform is reversible, the original waveform on the time axis is restored by applying inverse digital Fourier transform to frequency components that have once been digital Fourier transformed. Thus, in the example of the first embodiment, only to the i-th frequency component in the expressions (4) and (5), frequency transform and inverse transform are applied. Accordingly, the DFT transformer 172 described below calculates the following expression (6), and the inverse DFT transformer 175 and the normalizer 176 calculate an expression (7).

In other words, for predetermined data of N sequential samples, unlike the expression (5), only the case of M=i, where M=0, 1, ..., N−1, i.e. X(i) is processed.

$$X(i) = \sum_{k=0}^{N-1} x(k)\exp(-j2\pi ki/N) \quad (6)$$

The i-th frequency component X(i) as a result calculated by the DFT transformer 172 according to the expression (6) is outputted to the receiver side specific frequency component storage 173.

Now, it will be described how to select the i-th frequency component. In the first embodiment, for the purpose of using an auditory characteristic as described above to prevent the near end listener from sensing interruption of frequencies, the i-th frequency component may be selected to, for example, a component of 1.6 kHz falling between the first peak around 1 kHz and the second peak around 2 kHz of human voice. Needless to say, the component can be set to any other frequency component that does not cause the near end listener to sense interruption of frequencies, i.e. uncomfortable condition, and is not restrictive.

More specifically, as disclosed on the afore-mentioned website, http://www.onosokki.co.jp/HP-WK/c_support/newreport/soundquality/soundquality_2.htm, in the case of existence of an especially larger frequency component, the frequency masking effect tends to cause the effect of masking on the higher frequency component side from the starting point at the frequency component. This means that a signal having uneven frequency components, in other words, significantly larger and smaller components, such as a signal like human voice, behaves as if a somewhat higher frequency component adjacent to the larger frequency component did not exist in an auditory sense.

Thus, in the first embodiment, in consideration of the above, for example, a single frequency is selected which falls between the first peak around 1 kHz and the second peak around 2 kHz and has the highest power next to the first peak in human voice in the audio signal.

Note that, with respect to sampling for processing the signal, in the first embodiment, for example, a sampling frequency is set to 16 kHz, and a data holding period N is set correspondingly to 1120 samples. However, these values are not restrictive.

The receiver side specific frequency component storage 173 temporarily holds the i-th frequency component X(i) and outputs X(i) to the inverse DFT transformer 175 of the receiver side frequency-to-time converter 174.

The receiver side frequency-to-time converter 174 applies frequency inverse transform, or inverse digital Fourier transform, to the i-th frequency component X(i), and reproduces a temporal waveform along the time including N samples. For example, the receiver side frequency-to-time converter 174 calculates an expression (7).

$$x'(n) = \frac{1}{N}\sum_{m=i}^{i} X(m)\exp(j2\pi nm/N), \tag{7}$$

where $n = 0, 1, \ldots, N-1$.

Now, as seen from the expression (7), the waveform reproduced or restored by the inverse transform is a signal having a single frequency component. That is a signal having a pure component of the i-th frequency component in digital Fourier transform included in the audio signal, in other words, the i-th component tone waveform. In other words, in the process of the expressions (6) and (7), only the i-th frequency component included in the receiver input audio signal is extracted and reproduced to a waveform along the time.

An output x'(n) of the receiver side frequency-to-time converter 174 is delivered to the switch 177.

Figure 3:
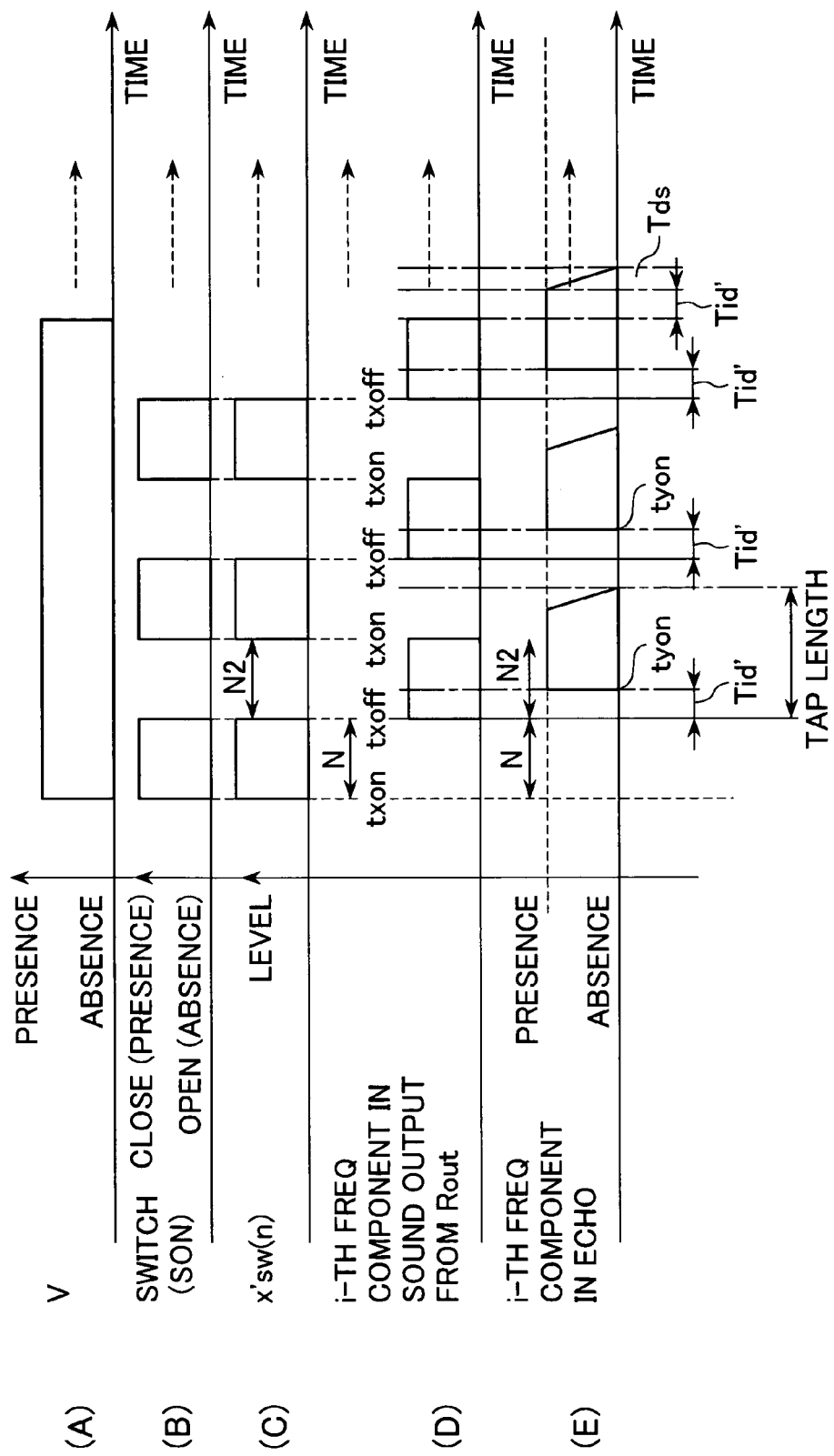
FIG. 3 shows waveforms useful for understanding a change in i-th frequency component level in a signal in the first embodiment.

Next, the timing of turning the switch 177 on or off will be described with reference to FIGS. 3 and 4. The switch 177 is turned on or off in response to the output of the timing controller 1a. As shown in FIG. 3, part (A), the timing controller 1a increments its counter, not shown, when receiving the voice activity detection signal v from the VAD 19, and as shown in part (B), periodically outputs at a predetermined time interval the timing signal SON for turning the switch 177 on during the first period of N samples starting from voice activity detection, the first txon in the figure. Otherwise, the significant signal SON is not outputted.

As shown in FIG. 3, part (B), when receiving the signal SON from the timing controller 1a, the switch 177 is turned on. As shown in part (C), an output signal x'sw(n) of the receiver side frequency-to-time converter 174 passes through to the component cancel adder 178.

Further, as shown in FIG. 3, parts (B) and (C), from the point txoff as a starting point, the timing controller 1a does not output the signal SON during a period of N2 samples so as to maintain the switch 177 off during this period. Additionally, the switch 177 repeats this operation while the voice activity signal is received.

Now, the N samples may preferably be set so as to have such a time length that the voice signal can be considered as a steady signal. For example, the time length is preferably set to 10 ms to 30 ms. Additionally, in order to avoid a period of echo tail described below, the N2 samples preferably have a length equal to or more than an adaptive filter length L. In the first embodiment, for example, the adaptive filter length L is set to 30 ms corresponding to a sampling frequency of 16 kHz and 480 samples, and N is set to be equal to N2. However, these values are not restrictive.

As described above, the switch 177 is turned on or off in response to the signal SON from the timing controller 1a being significant or not. The output x'sw(n) from the switch 177 is shown in FIG. 3, part (C), and outputted to the component cancel adder 178.

On the other hand, an output xh(n) from the data storage 171 is inputted to the component cancel adder 178. In the data storage 171, the audio signal x(n) inputted from the receiver input terminal 2 is held during a predetermined period, in other words, the time length of N samples and is delayed. Now, the predetermined period N for holding the signal in the data storage 171 is equal to the number N of samples to which digital Fourier transform is applied. This is for the purpose of synchronizing the audio signal waveform in itself with the i-th component extraction waveform x'(n) in order to add these waveforms.

The component cancel adder 178 adds the output signal xh(n) from the data storage 171 to the output signal x'sw(n) from the switch 177.

A signal resultant from the addition by the component cancel adder 178 has the i-th frequency component canceled. Therefore, focusing on the i-th frequency component of the audio signal, a signal having the frequency component periodically interrupted as shown in FIG. 3, part (D) will be outputted on the receiver output terminal 4.

The output from the receiver output terminal 4 is sent to the digital-to-analog converter 5 to be analog-converted by the digital-to-analog converter 5, and then emitted from the loudspeaker 7 as the audible sound to the near end listener, not shown. At the same time, part of the signal is inputted as the echo component y over the acoustic echo path 8 to the microphone 9. At this time, the echo is affected by the characteristic of the acoustic echo path 8.

The echo component y inputted to the microphone 9 is digital-converted by the analog-to-digital converter 11, and is inputted as the digital signal y(n) to the transmitter input terminal 12 of the echo canceller 1.

The signal y(n) from the transmitter input terminal 12 is inputted to the transmitter side specific frequency waveform restorer 18 of the near end noise estimator 3. The signal y(n) inputted to the transmitter side specific frequency waveform restorer 18 is represented by y1(n). The echo component y1(n) inputted to the transmitter side specific frequency waveform restorer 18 has only the i-th frequency component extracted by the DFT transformer 181 of the transmitter side time-to-frequency converter 180, as defined by an expression (8) similarly to the receiver side.

$$Y1(i) = \sum_{k=0}^{N-1} y(k)\exp(-j2\pi ki/N) \tag{8}$$

Now, it is important that a frequency component extracted by the DFT transformer 181 is set so as to be the same as the i-th frequency component selected on the receiver side.

The component y1(i) extracted by the DFT transformer 181 is outputted to the transmitter side specific frequency component storage 182 and is temporarily held in the transmitter side specific frequency component storage 182.

The transmitter side specific frequency component storage 182 sends its output to the inverse DFT transformer 183, and the inverse DFT transformer 183 inverse digital Fourier transforms the output into a waveform yt(n) along the time, as defined by an expression (9), similarly to the receiver side.

$$yt(n) = \frac{1}{N}\sum_{m=i}^{i} Y(m)\exp(j2\pi nm/N) \tag{9}$$

The output yt(n) from the transmitter side specific frequency waveform restorer 18 is inputted to the near end noise calculator 1b. Additionally, the near end noise calculator 1b receives the timing signal T from the timing controller 1a.

The near end noise calculator 1b estimates near end noise as described below. FIG. 4 plots an impulse response of the echo path 8 that is important for understanding a process in the near end noise calculator 1b. In the figure, the vertical and horizontal axes represent an amplitude and time, respectively.

Figure 4:
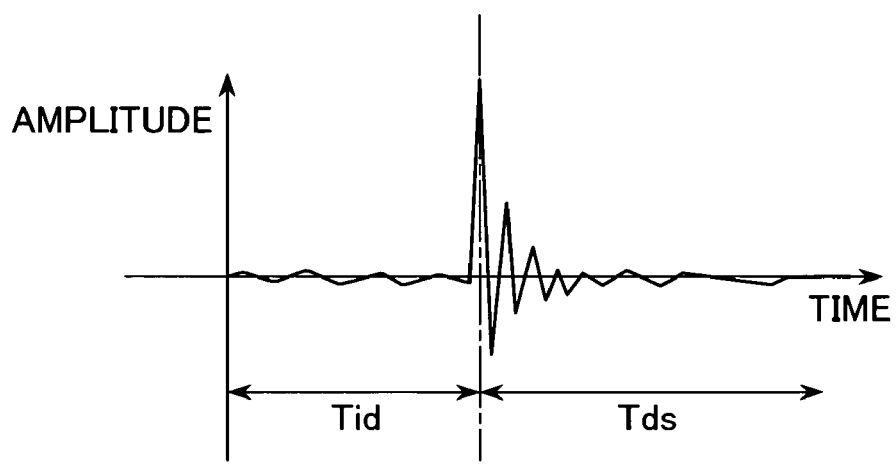
FIG. 4 plots a waveform useful for understanding how the acoustic echo path is in the first embodiment.

As seen from FIG. 4, on the acoustic echo path 8, its section earlier in time Tid includes a part in which the amplitude is smaller and which is immediately followed by a section Tds in which the amplitude gradually decreases. The section Tid is a so-called early delay, and Tds corresponds to a scattering response.

The signal outputted from the loudspeaker 7, corresponding to the i-th frequency component shown in FIG. 3, part (D), will appear as the echo over the acoustic echo path 8 which behaves as plotted in FIG. 4. Therefore, the positive-going edge of an interrupted signal in the echo component (the i-th frequency component) also appears periodically with a delay corresponding to Tid. The negative-going edge of the signal may basically behave similarly except that, with respect to a signal component outputted from the loudspeaker 7 immediately before the negative-going edge, the signal does not reach zero until the period Tds described with reference to FIG. 4 elapses.

That behavior is understood from FIG. 3, part (E). Part (E) reveals that, at the stating time of the first txon and at the time when a period of Tid+Tds has passed from txon since the second txon, so far as the i-th frequency component of interest is concerned, the microphone 9 can output an audio signal completely free of echo. The near end noise calculator 1b, FIG. 2, uses this part to calculate the near end noise as described below.

The near end noise calculator 1b receives the timing signal T for turning the switch 177 on and off from the timing controller 1a. When the switch 177 is turned on, the component cancel adder 178 subtracts the i-th frequency component from the audio signal x(n). Therefore, an audio signal component outputted from the component cancel adder 178 has the i-th frequency component X(i) eliminated.

Needless to say, the echo component y resultant from converting the reference signal x_ref(N) onto the time axis, thus the converted signal being emitted from the loudspeaker 7 also without including the i-th frequency component.

During N2 samples following, the switch 177 is turned off. Hence, the component cancel adder 178 does not subtract the i-th frequency component from the audio signal. Therefore, the echo component y also includes the i-th frequency component without modification, see FIG. 3, part (D).

The near end noise calculator 1b detects the level of the specific frequency component yt(n) in a manner similar to the VAD 19 on the receiver side and detects the positive-going edge of the signal. The near end noise calculator 1b calculates a period Tid' starting from the time txoff, FIG. 3, part (C), when the switch 177 is turned off to the time tyon, part (E), when the component yt(n) changes to the state "signal existing".

Then, the near end noise calculator 1b calculates the power of the signal as described below and sends a result of the calculation to the step gain calculator 15b.

Figure 5:
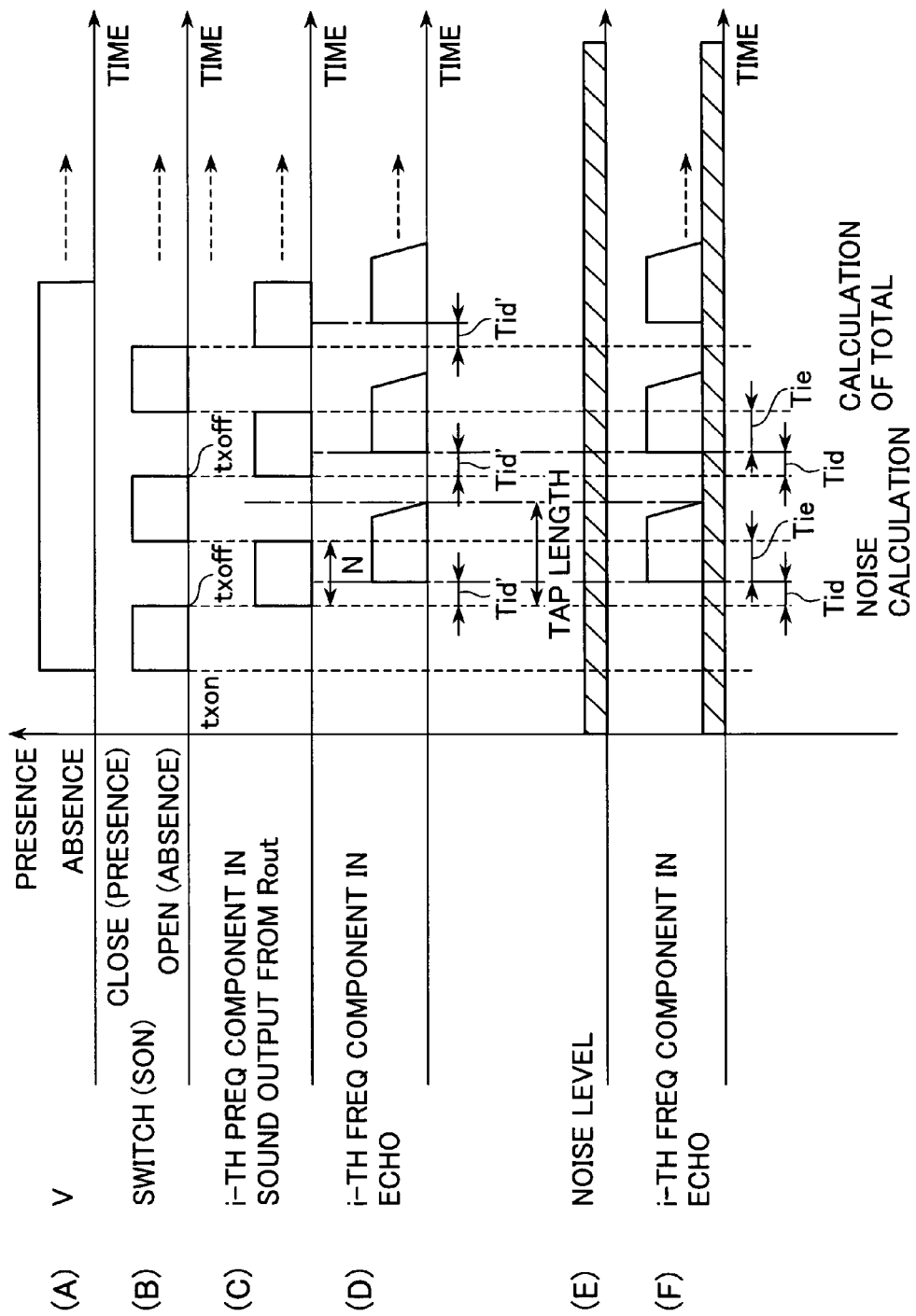
FIG. 5 shows waveforms useful for understanding calculation of the signal power in the near end noise calculator of the first embodiment.

With reference to FIG. 5, it will be described how the near end noise calculator 1b calculates the signal power. The near end noise calculator 1b calculates the average power Pn of an output signal sample y(n) during a period corresponding to Tid'. Furthermore, the near end noise calculator 1b similarly calculates the power Psn of the signal during a fixed period Tie immediately after the period Tid'.

The power Pn calculated by the near end noise calculator 1b is only of the pure near end noise as described below, and Psn is of the total of the near end noise and the echo.

For example, as shown in FIG. 5, part (E), in the case of existence of the near end noise, the signal power actually calculated by the near end noise calculator 1b during the period Tie is the total of the power of the near end noise and the echo.

Now, the number of samples during the period Tie can be properly defined by, for example, a designer of the echo canceller 1. For example, the number is preferably equal to or less than half of the tap length of the adaptive filter 15 or is more preferably equal to about ten percent of the tap length. The reason for this is that the acoustic echo path 8 generally has an exponential attenuation characteristic and that the calculation of the power after a too long period following the section Tid would mainly cause the power of the tail part of the echo to be calculated so as to underestimate the power of the echo.

In the first illustrative embodiment, the near end noise calculator 1b calculates the power of a near end signal during a period which is set just equivalent to the periodTid'. However, the setting of the period Tid' may not be restrictive to this but may properly have a margin set forward on the time axis. However, as described above, in order to prevent a so-called echo tail from mixing as the near end noise signal in the calculation, the power calculation may preferably exclude samples during a period starting from the time txoff temporally backward and corresponding to the number of taps of the adaptive filter 15.

The reason for this is that the number of taps of the adaptive filter 15 is often set to be adjusted to an entire time response of the acoustic echo path 8, i.e. Tid+Tds in FIG. 3, part (E). In short, it may be preferable to allow the entire response period of the echo to elapse prior to calculating the i-th frequency component of the output signal of the microphone 9.

Figure 6:
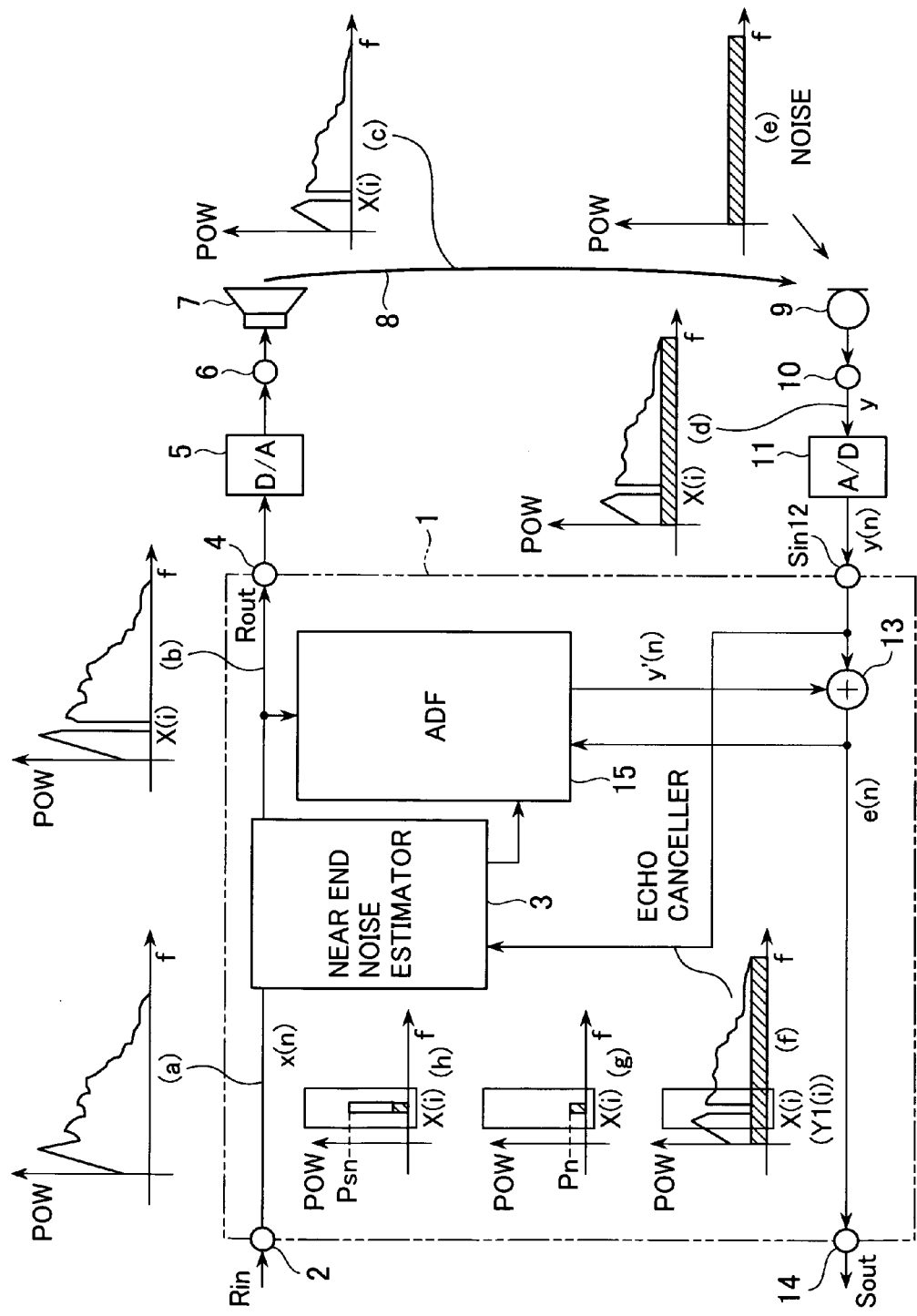
FIG. 6 schematically shows frequency spectra together with the internal configuration of the echo canceller of the first embodiment, useful for understanding the signal power until estimating near end noise.

FIG. 6 shows the power of the audio signal until the echo canceller 1 extracts the near end noise in connection with the respective components and elements. In FIG. 6, each of graphs (a) to (h) has its horizontal and vertical axes representing a frequency and signal power, respectively. In the graphs, the waveforms represent power distributions of a far end audio frequency, and hatched parts indicate power distributions of the near end noise.

The audio signal x(i) arriving from the far end shown in graph (a) has a frequency component X(i) eliminated by the near end noise estimator 3 as shown in graph (b) to output an audio signal as shown in graph (c) from the loudspeaker 7.

Then, the signal as shown in graph (c) is inputted as the echo component over the acoustic echo path 8 to the microphone 9. At this time, since the near end noise as shown in graph (e) is also inputted to the microphone 9, a total signal of the echo component and the near end noise as shown in graph (d) is outputted from the microphone 9.

The near end noise estimator 3 extracts the specific frequency component X (i), graph (f), finds the power Pn of only the near end noise when the frequency component X(i) is eliminated as shown in graph (g), and finds the total power Psn of the echo power and the noise power when the frequency component X(i) is not eliminated as shown in graph (h).

The near end noise calculator 1b outputs the total power Psn of the echo component and the near end noise signal and the power Pn of the near end noise signal without the echo component calculated as described above to the step gain calculator 15b.

Figure 7:
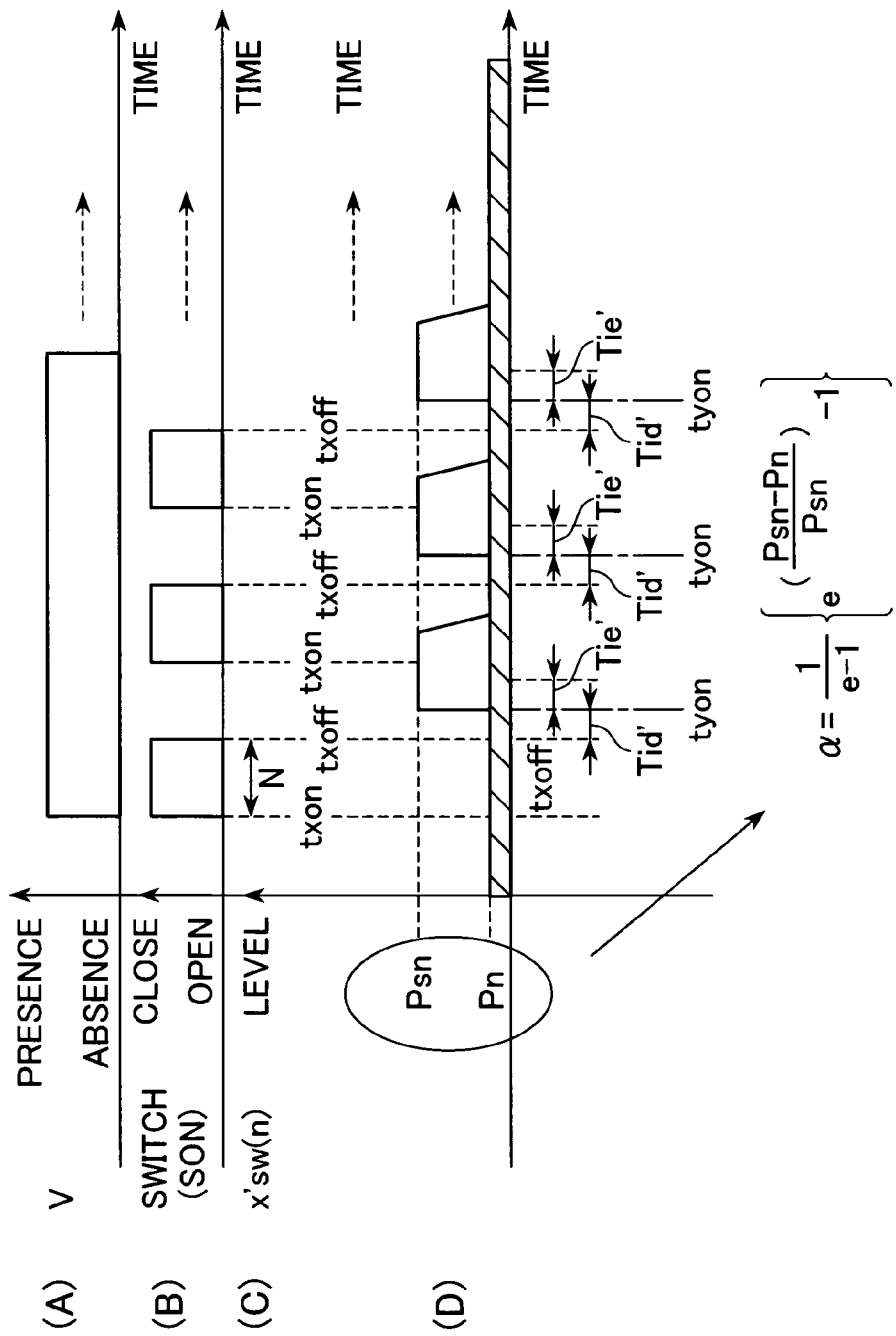
FIG. 7 shows waveforms useful for understanding calculation of a step gain in the step gain calculator of the first embodiment.

It will next be described how the step gain calculator 15b calculates a step gain with reference to FIG. 7. The step gain calculator 15b calculates a step gain for updating a filter coefficient of the adaptive filter 15 on the basis of Pn and Psn received from the near end noise estimator 3.

As described above, the step gain is a parameter controlling a speed of convergence of the echo canceller 1. For example, refer as a to a step gain in the Normalized Least Mean Squires (NLMS) algorithm that is a known echo canceller identification algorithm. Then, the step gain a is selected as a constant satisfying $0<\alpha<2$ on the basis of a theoretical stability condition of a system. Alternatively, in order to prevent instability due to influence of noise or the like from a practical viewpoint, the step gain $\alpha$ may also be selected as a constant satisfying $0 \leq \alpha \leq 1$.

When a signal from the microphone 9 is an echo caused by a variation or fluctuation on the echo path or the like, the step gain $\alpha$ is preferably set as a relatively large value. Inversely, when the signal component from the microphone 9 is mainly of noise, the step gain $\alpha$ is preferably set as a relatively small value.

Additionally, the noise may often include a signal such as the near end talker signal which is significantly higher in power than the echo component. Therefore, the step gain $\alpha$ may preferably have its abruptly changeable property such that the step gain $\alpha$ rapidly decreases when noise is a predominant component and that the step gain $\alpha$ rapidly returns from a small value to large when an echo is a predominant component.

From this, the step gain calculator 15b is adapted to control the setting of a value of the step gain $\alpha$ by means of, for example, an exponential function having its input-to-output characteristic drastically changeable as defined by an expression (10) rather than a linear function applying a simple multiple.

$$\alpha = \exp\left\{\left(\frac{P_{sn} - P_n}{P_{sn}} - 1\right)\right\} \quad (10)$$

In the first embodiment, Napier's constant e known for use in a general base is used as the base of the exponential function. However, the base may not be restricted to this value. Instead of e, a constant a satisfying $a > 1.0$ may also be used as the base of the function.

In the expression (10), when no near endnoise is included in the output signal of the microphone 9, the power Pn is equal to zero, so that the step gain $\alpha$ is equal to $e^0=1$. In the case of the output signal of the microphone 9 including only the near end noise, the step gain $\alpha$ is equal to $e^{-1} \approx 0.3678$. The function defines such a curve that the step gain $\alpha$ takes a value of 1.0 in the case of the output signal of the microphone 9 mainly including the echo and takes a small value of $e^{-1} \approx 0.3678$ in the case of the output signal of the microphone 9 mainly including the noise.

In the first embodiment, the role of the step gain is devised more properly to use an expression (10').

$$\alpha = \frac{1}{e-1}\left\{\exp\left(\frac{P_{sn} - P_n}{P_{sn}}\right) - 1\right\} \quad (10')$$

In the expression (10'), for example, in the case of no noise component at all in the power of the output signal of the microphone 9, the power Pn is equal to zero, so that the step gain $\alpha$ is equal to 1.0 as defined by an expression (10'-1). Inversely, in the case of the power of the output signal of the microphone 9 including only the noise component, the step gain $\alpha$ is equal to zero as shown in an expression (10'-2).

$$\alpha = \frac{1}{e-1}\left\{\exp\left(\frac{P_{sn}}{P_{sn}}\right) - 1\right\} = \frac{e-1}{e-1} = 1 \quad (10'\text{-}1)$$

$$\alpha = \frac{1}{e-1}\left\{\exp\left(\frac{0}{P_{sn}}\right) - 1\right\} = \frac{e^0 - 1}{e-1} = 0 \quad (10'\text{-}2)$$

Since calculation of the step gain in the step gain calculator 15b is important, a calculation manner and an entire meaning of the expression (10)' will be described in more detail. Where the power of only the near end noise is Pow_n and the power of only the echo is Pow_e in the output signal component of the microphone 9, the power Psn calculated by the near end noise calculator 1b is represented by an expression (11).

$$Psn = Pow\_n + Pow\_e \quad (11)$$

However, to focus attention on the i-th frequency component of interest, by eliminating an original signal, causing the echo, of the component of interest, the power Pn can be directly calculated during a period, e.g. Tid', free from an echo caused.

$$Psn = Pow\_n = Pn \quad (12)$$

That makes it possible for the step gain calculator 15b to calculate the power exclusively of the echo from the expressions (11) and (12), as expressed by an expression (13).

$$Psn - Pn = Pow\_n + Pow\_e - Pow\_n = Pow\_e \quad (13)$$

Consequently, it will be understood that the first term of the exponential term of the exponential function in the expression (10) is represented by an expression (13'), so that it is equal to 1.0 in the case of no noise in the output signal component of the microphone 9 (Pow_n=0) and is equal to zero in the case of the output signal component of the microphone 9 mainly including the noise inversely (Pow_e=0).

$$\{(Psn - Pn)/Psn\} = \{Pow\_e/(Pow\_n + Pow\_e)\} \quad (13')$$

More specifically, depending on whether the output signal component of the microphone 9 predominantly includes the noise or the echo, the step gain $\alpha$ of the expression (13) is a parameter taking a variable value, as defined by an expression (14), depending on the ratio of the noise component in the output signal of the microphone 9.

$$0(\text{only noise}) \leq \{Pow\_e/(Pow\_n + Pow\_e)\} \leq 1.0(\text{only echo}) \quad (14)$$

Since the expression (10') has the expression (13') as its exponential term, it emphasizes an increase and a decrease in step gain $\alpha$ more extensively than directly using the expression (10') as the step gain $\alpha$.

As understood from the expressions (10) to (14), in the first embodiment, the step gain $\alpha$ takes a larger value in the case of the larger echo component. Therefore, if the echo path varies, the step gain $\alpha$ is automatically set to a large value to thereby cause the adaptive filter 15 to converge immediately.

As described above in detail, in the expression (10'), when the echo is a main component, the step gain $\alpha$ is set to 1.0 as the upper limit of the step gain establishing a high convergence rate. Inversely, when the noise is a main component, the step gain $\alpha$ is set so as to rapidly decrease toward zero as the lower limit of the step gain withstanding a disturbance from the outside. Thus, without special consideration to the setting by a designer, the optimum value can be automatically set.

Additionally, the first embodiment is adapted such that, in the case of neither echo nor noise existing, the step gain $\alpha$ is set to zero. The reason for this is that in the case of no echo, the echo canceller 1 does not need to cancel the echo and that the acoustic echo path 8 also does not need to be identified.

Additionally, in the first embodiment, the step gain calculator 15b calculates the step gain by using the step gain α in the expression (10'). However, in order to allow the adaptive filter 15 to update its coefficient more sensitively to a change in step gain, the exponential function may also be further multiplied by a constant K as defined by expressions (15) and (16).

Alternatively, in another calculation manner, as expressed by an expression (17), the step gain α may also be exponentiated by a positive real number γ to thereby change the rate of change in step gain while maintaining the step gain between 0 and 1.0, inclusive, that is a stability condition of the echo canceller 1.

$$\alpha = K \cdot \exp\left\{\left(\frac{P_{sn} - P_n}{P_{sn}} - 1\right)\right\} \quad (15)$$

$$\alpha = \frac{K}{e-1} \cdot \exp\left\{\left(\frac{P_{sn} - P_n}{P_{sn}} - 1\right)\right\} \quad (16)$$

$$\alpha = K \cdot \left[\exp\left\{\left(\frac{P_{sn} - P_n}{P_{sn}} - 1\right)\right\}\right]^\gamma, \quad (17)$$

where K is a constant satisfying $0 \leq K$, and γ is a real number satisfying $0 < \gamma$.

Moreover, although the rate of change in step gain is slower, a result of the calculation obtained by the expression (13) may be used as the step gain in order to simplify the calculation.

In short, calculation of the step gain can be changed depending on an outside environment as described above and is not restricted to the above-described manners. Other manners can be applied. However, just for simplicity, the first illustrative embodiment is adapted to use the step gain α in the expression (10') as an example of the step gain.

The step gain calculator 15b outputs the step gain α thus calculated as described above to the pseudo echo generator 15a.

Figure 8:
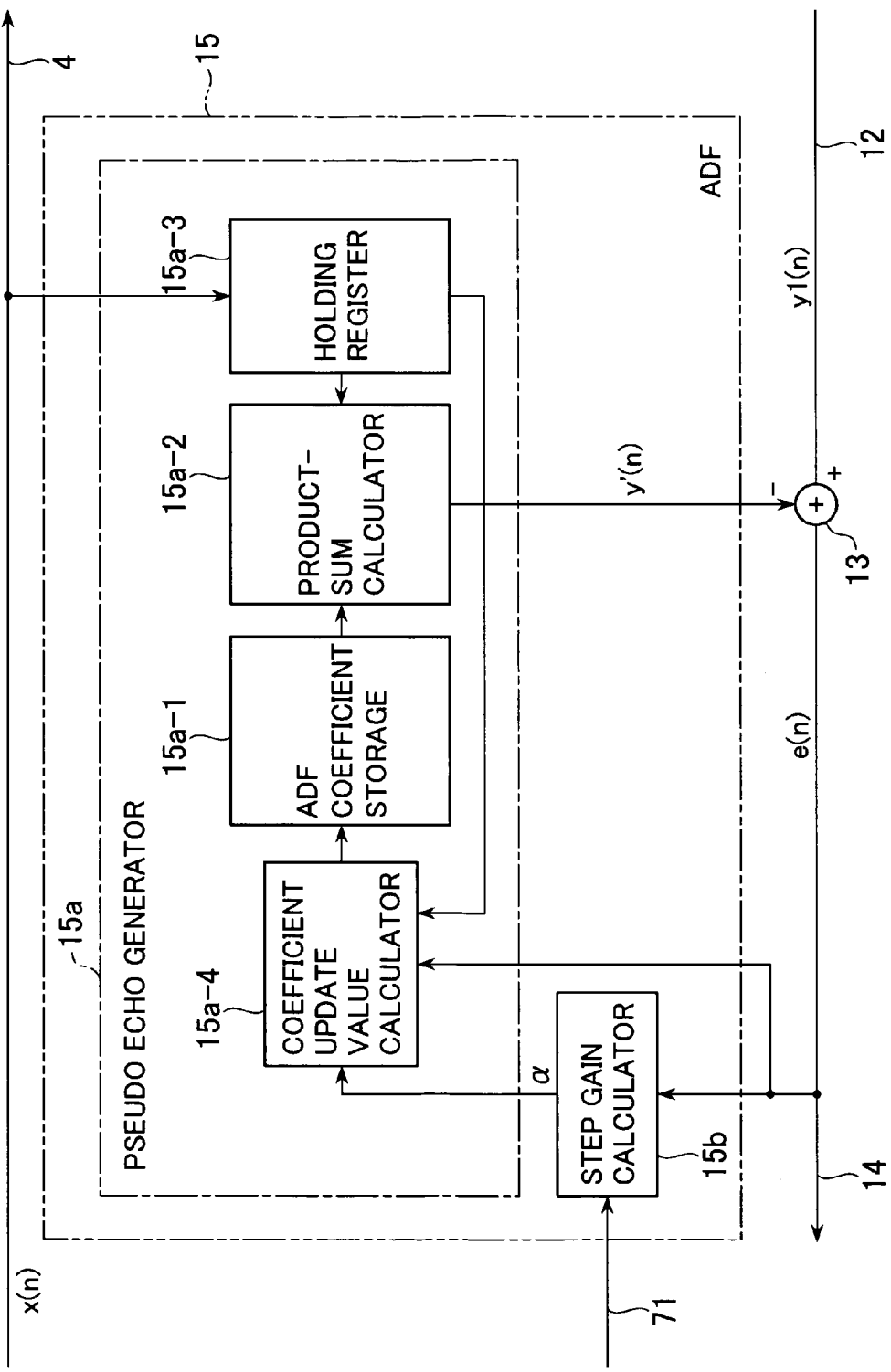
FIG. 8 is a schematic block diagram showing the internal configuration of the pseudo echo generator of the first embodiment.

Next, operation of for generating a pseudo echo by the pseudo echo generator 15a will be described. FIG. 8 schematically shows in a block diagram the internal configuration of the pseudo echo generator 15a. The pseudo echo generator 15a includes at least an adaptive filter coefficient storage 15a-1, a product-sum calculator 15a-2, a holding register 15a-3, and a coefficient update value calculator 15a-4, which are interconnected as depicted.

The pseudo echo generator 15a uses coefficient update algorithm, such as NLMS algorithm, to generate the pseudo echo signal on the basis of the audio signal x(n) inputted from the receiver input terminal 2, the residual signal e(n) and the step gain α from the step gain calculator 15b, as will be described below.

First, the audio signal x(n) from the receiver input terminal 2 is stored in the holding register 15a-3 and is treated as a data vector as defined below.

$$X(n) = [x(n), x(n-1), \ldots, x(n-L+1)]^t, \quad (18)$$

where n is the order of the samples, and L is the number of taps of the adaptive filter. For example, in the first embodiment, the case of L=1024 is exemplified. However, L may not be restricted to this value. Additionally, t represents the transpose of a matrix.

The expression (18) represents a data vector of the received signal constituted by a set of data of the received signal x(n) obtained by past L samples held from the stating time which is current time n.

On the other hand, the adaptive filter coefficient storage 15a-1 has filter coefficients stored which have L coefficient values. The values of coefficient may be updated on a real time basis by the coefficient update value calculator 15a-4 by means of, e.g. the NLMS algorithm, as will be described later.

The L coefficients in the adaptive filter coefficient storage 15a-1 may be treated as a single coefficient vector as defined by an expression (19).

$$H(n) = [h(0), h(1), \ldots, h(L-1)]^t, \quad (19)$$

where L represents the number of taps of the adaptive filter. In the first embodiment, L is set to, e.g. 1024, which is not restrictive.

The product-sum calculator 15a-2 receives the coefficient vector from the adaptive filter coefficient storage 15a-1 and the data vector from the holding register 15a-3, and uses the coefficient vector and the data vector to calculate a product y'(n) of the vector according to an expression (20).

$$y'(n) = H^t(n) \times (n) \quad (20)$$

The product y'(n) is treated as sampled data of the pseudo echo signal. The product y'(n) is thus scalar value data having a single value.

The pseudo echo signal y'(n) generated as described above is outputted from the product-sum calculator 15a-2 to the echo cancel adder 13.

The echo cancel adder 13 receives the digital-converted echo component y(n) from the loudspeaker 7 through the microphone 9 as described above, and adds and cancels the signal as expressed by an expression (21) to output the residual signal e(n) to the transmitter output terminal 14.

$$e(n) = y(n) - y'(n) \quad (21)$$

Then, the signal outputted from the transmitter output terminal 14 will be transmitted as the audio signal toward the far end listener, not shown.

In turn, the residual signal e(n) outputted from the echo cancel adder 13 is sent to the coefficient update value calculator 15a-4. The data vector X(n) in the holding register 15a-3 is also sent to the coefficient update value calculator 15a-4. Furthermore, the step gain α calculated by the step gain calculator 15b is also delivered to the coefficient update value calculator 15a-4.

The coefficient update value calculator 15a-4 uses the residual signal e(n), the data vector X(n) and the step gain α to update the filter coefficient of the adaptive filter according to the NLMS algorithm exemplified by an expression (22).

$$H(n+1) = H(n) + \alpha \frac{x(n)e(n)}{\sum_{i=0}^{L-1} x^2(n-i)} \quad (22)$$

The expression (22) represents that an adaptive filter coefficient vector for use in generating the next pseudo echo is generated from the current samples e(n) and X(n).

The coefficient vector generated as described above is outputted from the coefficient update value calculator 15a-4 to the adaptive filter coefficient storage 15a-1, and is used together with the input vector X(n) for generating the pseudo echo signal by the expression (20).

The expression (22) is calculated several times as time elapsing to make progress in updating the adaptive filter coefficient. Then, the residual signal e(n) of the expression (21) by the echo cancel adder 13 decreases gradually. After that, when the residual signal e(n) decreases sufficiently, the coefficient update value calculator 15a-4 becomes hardly updating the coefficient by the expression (22), thus entering such a state that "the adaptive filter converges".

Upon the adaptive filter having converged, the echo cancel adder 13 can continue to accurately cancel the echo.

With the first embodiment, the adaptive filter is exemplarily adapted for using the NLMS algorithm as described above for coefficient updating. However, any algorithms capable of estimating the echo may be applied as echo estimation algorithm, as is not limitative.

In summary, in the first embodiment, a single frequency between the first peak around 1 kHz and the second peak having the highest power next to the first peak in human voice activity in the audio signal is selected as a specific frequency component to utilize the phenomenon that this specific frequency component is insensible to a human due to the frequency masking effect so as to interrupt the specific frequency component. Such interruption of the echo allows a signal for observation, i.e. reference signal, to be generated for measuring the noise and echo with the echo distinguished from the near end noise, which would otherwise essentially be inseparable from each other when listened to.

Specifically, the specific frequency interrupter 17 generates the reference signal x_ref(n) having the specific frequency component periodically eliminated. The reference signal x_ref(n) is emitted from the loudspeaker 7 to acoustic space. The specific frequency waveform restorer 18 reproduces the specific frequency component from an echo component captured. Then, the near end noise calculator 1b calculates the signal power of the specific frequency component in the echo component at a predetermined timing to thereby find the power Pn of only the near end noise as well as the total power Psn of the near end noise and the echo for the respective different periods. The step gain calculator 15b calculates the power Pow_e of the pure echo from Pn and Psn.

In addition, the step gain calculator 15b calculates the step gain for use in the identification algorithm of the adaptive filter 15 on the basis of the echo power Pow_e and the total power Psn (=Pow_n+Pow_e). Thereby, without providing a sub adaptive filter or the like susceptible to a disturbance and without depending on the state of convergence of a coefficient in the sub adaptive filter, the step gain can be independently calculated on the basis of the state of the echo power Pow_e and the near end noise Pow_n.

Therefore, according to the first embodiment, a change in echo due to a variation on echo path is reflected in Pow_e, and a variation in near end noise is reflected in Pow_n. Therefore, it can be determined whether or not a variation in environment is caused by a variation or fluctuation in echo path or near end noise. As a result, in response to an acoustic environment around the near end talker, the step gain of the echo canceller 1 is set to permit the echo to be optimally eliminated.

In other words, even when the near end noise increases or when the acoustic echo path 8 varies to a certain extent, the performance of the echo canceller 1 can be rapidly recovered to stably eliminate the echo. On the other hand, in the case of the smaller noise, the larger step gain is used which is capable of quickening the convergence of the echo canceller 1.

As a result of those improvements, the echo canceller 1 can be provided that can automatically rapidly eliminate the echo from the start of operation of a device and that can stably eliminate the echo without being affected by a change in environment such as a variation in near end noise and the acoustic echo path 8.

Furthermore, in the first embodiment, the unique manner for eliminating a frequency is used. Thus, the component cancel adder 178 adds a temporal signal x'(n) consisting of the predetermined single i-th frequency signal generated by the DFT transformer 172 and the inverse DFT transformer 175 to the audio signal to cancel only the specific frequency component from the signal.

Ordinarily, in order to implement a band-stop filter and a bandpass filter for eliminating or extracting such a single frequency, for example, a digital band-stop finite impulse response (FIR) filter or infinite impulse response (IIR) filter of an extremely higher order would be required.

For example, in order to eliminate only a frequency component of 1 kHz, finite impulse response filter coefficients corresponding to 256 taps or more than would be necessary in the case of a sampling rate of 16 kHz. In order to obtain a filtered intermediate output during 10 ms (160 samples), according to the relationship (the number of tap coefficients)×(the number of data held in the filter)×(the number of frames), approximately 256×160=40960 calculations (81920 in total) would be necessary only for multiplications. However, with the first embodiment, in order to eliminate a component of 1 kHz during one frame, values of trigonometric functions such as sine and cosine can be held in a reference table without calculations. Therefore, each of multiplications and additions requires (160 samples)×(2 times) of calculations because of two calculations necessary for a real part and an imaginary part when applying DFT to a single component, as well as (160 samples)×(2 times) of calculations because of two calculations necessary for a real part and an imaginary part when applying inverse DFT to a single component. Additionally, 160 of multiplications corresponding to the number of samples are necessary for normalization in inverse DFT. Approximately, an intermediate output signal having a component eliminated can be obtained by 160×4=640 of additions and 800 of multiplications, which are 1440 of calculations in total. For example, when implemented by a signal processor, the number of calculations is significantly decreased.

Therefore, according to the first embodiment, since a signal is eliminated by canceling a pure component signal as described above, a single frequency component can be ideally eliminated or extracted by only simple multiplications for complex trigonometric functions and subtractions for temporal waveforms without providing a band-stop processing filter having a large order. Thus, in addition to excellent frequency selectivity, calculation cost can also be significantly reduced in comparison with the prior art.

(B) Second Embodiment

Now, description will be made to an echo canceller in accordance with the second embodiment of the present invention. The second embodiment may be the same as the first embodiment except for the function and configuration of the near end noise estimator. Since the remaining components and elements may be the same as the first embodiment, description will be concentrated on the function of the near end noise estimator.

Figure 9:
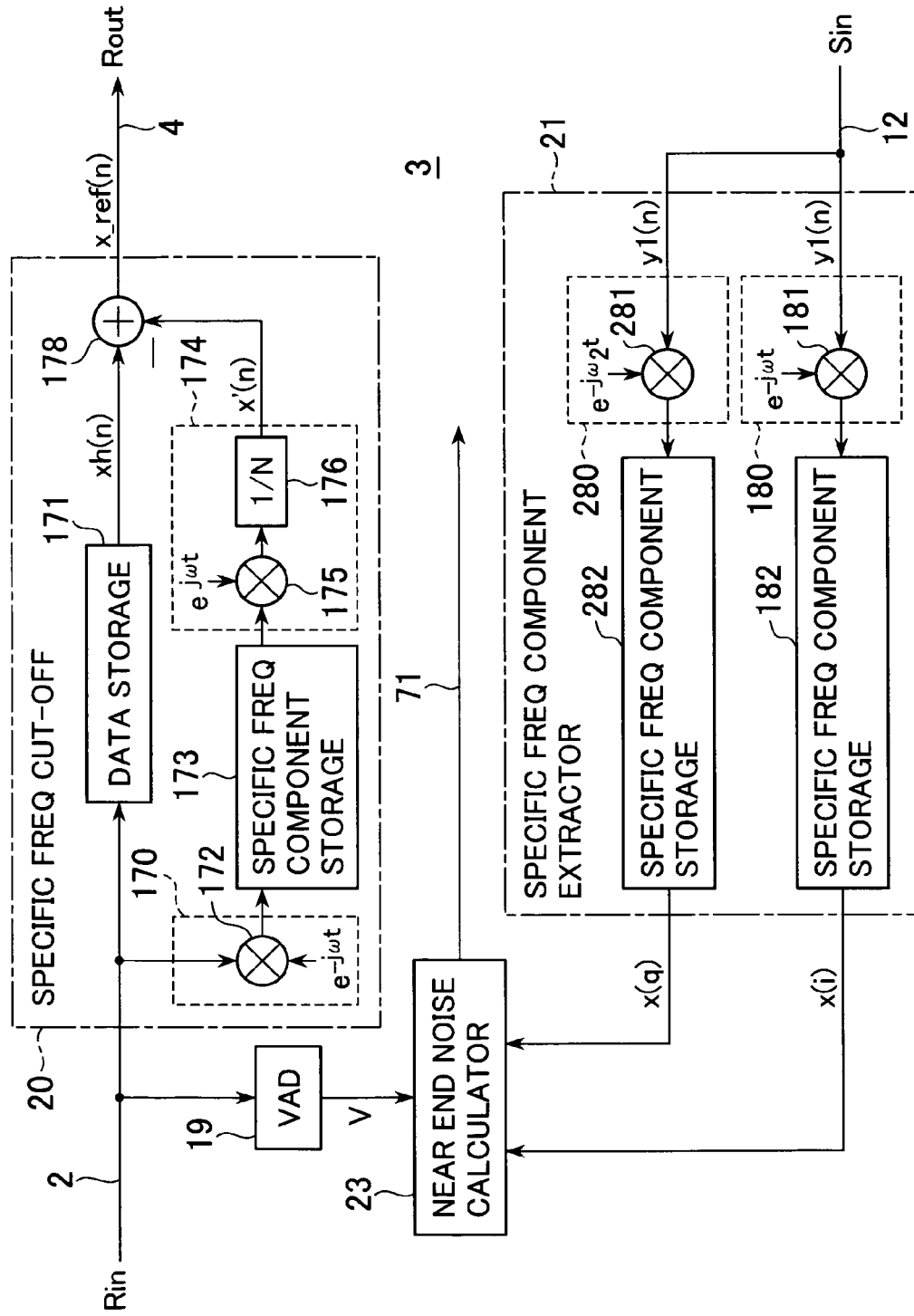
FIG. 9 is a schematic block diagram showing the internal configuration of the near end noise estimator of a second embodiment.

With reference to FIG. 9, the internal configuration of the near end noise estimator 3 of the second embodiment with be described. The near end noise estimator 3 of the second embodiment includes at least the VAD 19, a specific frequency cut-off section 20, a transmitter side specific frequency component extractor 21, and a near end noise calculator 23, which are interconnected as shown.

The specific frequency cut-off section 20 is formed by the receiver side time-to-frequency converter 170 including the DFT transformer 172, the data storage 171, the receiver side specific frequency component storage 173, the receiver side frequency-to-time converter 174 including the inverse DFT transformer 175 and the normalizer 176, and the component cancel adder 178, which are interconnected as shown.

The transmitter side specific frequency component extractor 21 includes at least a transmitter side time-to-frequency converter 280 including a DFT transformer 281, and a specific frequency component storage 282 in addition to the transmitter side time-to-frequency converter 180 including the DFT transformer 181, and the specific frequency component storage 182. Those components are interconnected as depicted.

The near end noise estimator 3 in FIG. 9 may be the same as FIG. 2 except for exclusion of the timing controller 1*a* or the switch 177 and the specific frequency cut-off section 20 in place of the specific frequency interrupter 17.

The specific frequency cut-off section 20 may be different from that of the first embodiment in lacking the switch 177. The specific frequency interrupter 17 of the first embodiment outputs the reference signal x_ref(n) having the specific frequency component, e.g. i-th frequency component, periodically interrupted by turning the switch 177 on or off. However, the specific frequency cut-off section 20 continuously outputs a reference signal x_ref(n) having the specific frequency component always eliminated.

The second embodiment may be the same as the first embodiment except for the near end noise calculator 23 and the specific frequency component extractor 21 in place of the timing controller 1*a* and the specific frequency waveform restorer 18, respectively, as well as the second transmitter side time-to-frequency converter 280 and the second specific frequency component storage 282 provided in addition to the transmitter side time-to-frequency converter and the specific frequency component storage described above in connection with the first embodiment in the specific frequency component extractor 21, and a frequency component being outputted to the near end noise calculator 23.

In operation, first, on the receiver path side, the audio signal x(n) inputted from the receiver input terminal 2 is delivered to the VAD 19 and the specific frequency cut-off section 20. The VAD 19 detects a voice activity signal similarly to the first embodiment.

Also similarly to the first embodiment, the specific frequency cut-off section 20 eliminates the specific frequency component, e.g. i-th frequency component, in the audio signal x(n) by the receiver side time-to-frequency converter 170, the specific frequency component storage 173, and the receiver side frequency-to-time converter 174.

On the other hand, in the specific frequency cut-off section 20, the data storage 171 holds the audio signal x(n) during a period of N samples, and the component cancel adder 178 always continuously outputs the reference signal having only the specific frequency component eliminated.

Thus, the reference signal x_ref(n) outputted from the specific frequency cut-off section 20 has the i-th frequency component always eliminated according to, for example, the expression (6), and will be emitted as sound through the loudspeaker 7.

Meanwhile, also similarly to the first embodiment, part of the signal outputted from the loudspeaker 7 is captured over the acoustic echo path 8 by the microphone 9 and is digital-converted by the analog-to-digital converter 11.

The process up to this time may be similar to the first embodiment. However, since subsequent processing on the transmitter path side is unique to the second embodiment, and will therefore be described in detail.

The digital signal y1(*n*) from the transmitter input terminal 12 is inputted to the transmitter side specific frequency component extractor 21. In the transmitter side specific frequency component extractor 21, the digital signal y1(*n*) is inputted to the first transmitter side time-to-frequency converter 180 and the second transmitter side time-to-frequency converter 280.

Each signal y1(*n*) inputted to the first transmitter side time-to-frequency converter 180 and the second transmitter side time-to-frequency converter 280 has the frequency component extracted to output the extracted frequency component to the near end noise calculator 23 similarly to the first embodiment.

Now, the transmitter side specific frequency component extractor 21 extracts not only the specific frequency component, i.e. i-th frequency component, eliminated by the specific frequency cut-off section 20 but also the second frequency component, q-th frequency component in this case. This q-th frequency component can be extracted by replacing i of the expression (6) in the first embodiment with q (i≠q).

However, the q-th frequency component may preferably be as close as possible to the i-th frequency component. Because, normally the frequency components of a voice may not be flat over its entire frequency range but involve minute increases and decreases in power spectrum based on the basic frequency as well as increases and decreases caused by the format characteristics, so that it becomes more difficult to obtain the ratio of the power of actual echo to the near end noise when the two components are rendered more separate in frequency from each other.

In the second illustrative embodiment, for example, the first frequency component, e.g. i-th frequency component, is set to 1.6 kHz, and the second frequency component, i.e. q-th frequency component, is set to 1.65 kHz. However, these values of the components are not restrictive.

The near end noise calculator 23 uses the first frequency component X(i) and the second frequency component X(q) in the frequency domain without modification to calculate the power Pn_f(i) of the first frequency component X(i) and the power Psn_f(q) of the second frequency component X(q), respectively, according to expressions (23).

$$P_n\_f(i) = X(i) \cdot X(i)^* = |X(i)^2|$$

$$P_{sn}\_f(q) = X(q) \cdot X(q)^* = |X(q)^2| \quad (23)$$

where * represents a complex conjugation.

The near end noise calculator 23 treats the power Pn_f(i) of the first frequency component X(i) and the power Psn_f(q) of the second frequency component X(q) as the power Pow_n of only the near end noise described in the expression (12) of the first embodiment and the total power Psn of the echo and the near end noise described in the expression (11) as defined by expressions (24) and (25), respectively, and outputs this power to the step gain calculator 15*b*.

$$Pn = Pn\_f(i) \quad (24)$$

$$Psn = Psn\_f(q) \quad (25)$$

The step gain calculator 15*b* may be the same as the first embodiment described earlier. Of course, the step gain calculator 15*b* may operate also in the same way as the first embodiment. Repetitive description thereon will be avoided.

In summary, according to the second embodiment, the specific frequency cut-off section 20 is operable to always cut off only the specific frequency band imperceptible to the near end listener of the entire audible frequency band of the far end talker signal to emit the processed signal as sound, the transmitter side specific frequency component extractor 21 extracts two kinds of frequency components, and the near end noise calculator 23 calculates the power of two kinds of frequency components to find the step gain. The performance of the echo canceller 1 will thus be improved as described below.

In the first embodiment, the specific frequency component is periodically eliminated on the receiver path side during a predetermined period of N samples so as to be interrupted, and the power of the specific frequency component is calculated during each period on the transmitter path side to thereby calculate the power of the echo and of the noise.

Also in the first embodiment, for example, in an application where a device designer previously knows the size of a room for the near end talker or knows that the period of N samples has enough in length for an echo response of the room, the performance of the echo canceller 1 can be sufficiently attained.

However, as often prevailing in recent years, for example, when the size of a room can be changed by dividing the room by a movable partition, or when large acoustic reflection is caused by the significantly smooth material or the like of the wall or floor surfaces of the room, an interrupting period N estimated from the dimension between the walls of the room or the like may not always be proper so as not to provide the performance of the echo canceller 1.

For example, depending on acoustic reflection by the material of wall surfaces, the echo tail Tds shown in FIG. 3 is longer, so that the designer may often estimate the interrupting period N too small. In this case, the echo tail Tds may overlap with the forepart of the echo following thereto, so that the power of the near end noise may not accurately be calculated.

In the second embodiment in consideration of the above, however, on the receiver path side the specific frequency is maintained as eliminated. So far as the echo of the frequency component X(i) is concerned, it does not occur from the beginning to end of a speech connection established.

On the other hand, on the transmitter path side, the transmitter side specific frequency component extractor 21 extracts the first frequency component X(i) and the second frequency component X(q) that are two kinds of frequency components from the output signal of the microphone 9. Therefore, the first frequency component X(i) eliminated on the transmitter path side does not contain the echo but only the near end noise. The second frequency component X(q) can include the echo so as to be a signal containing the echo and the near end noise mixed. Therefore, this signal power is used to calculate the step gain, thereby allowing the echo canceller 1 to exhibit its full performance.

Therefore, in the second embodiment, on the receiver path side, the specific frequency component of the audio signal x(n) does not have to be periodically interrupted. As a result, even when it is difficult for the designer to estimate an echo response length as increasingly complicated in recent years, the echo canceller 1 can be provided that automatically calculates the optimum step gain in dependent upon the amount of the near end noise or the state of change in echo and eliminates the echo rapidly and accurately to improve telephonic speech quality.

(C) Third Embodiment

Figure 10:
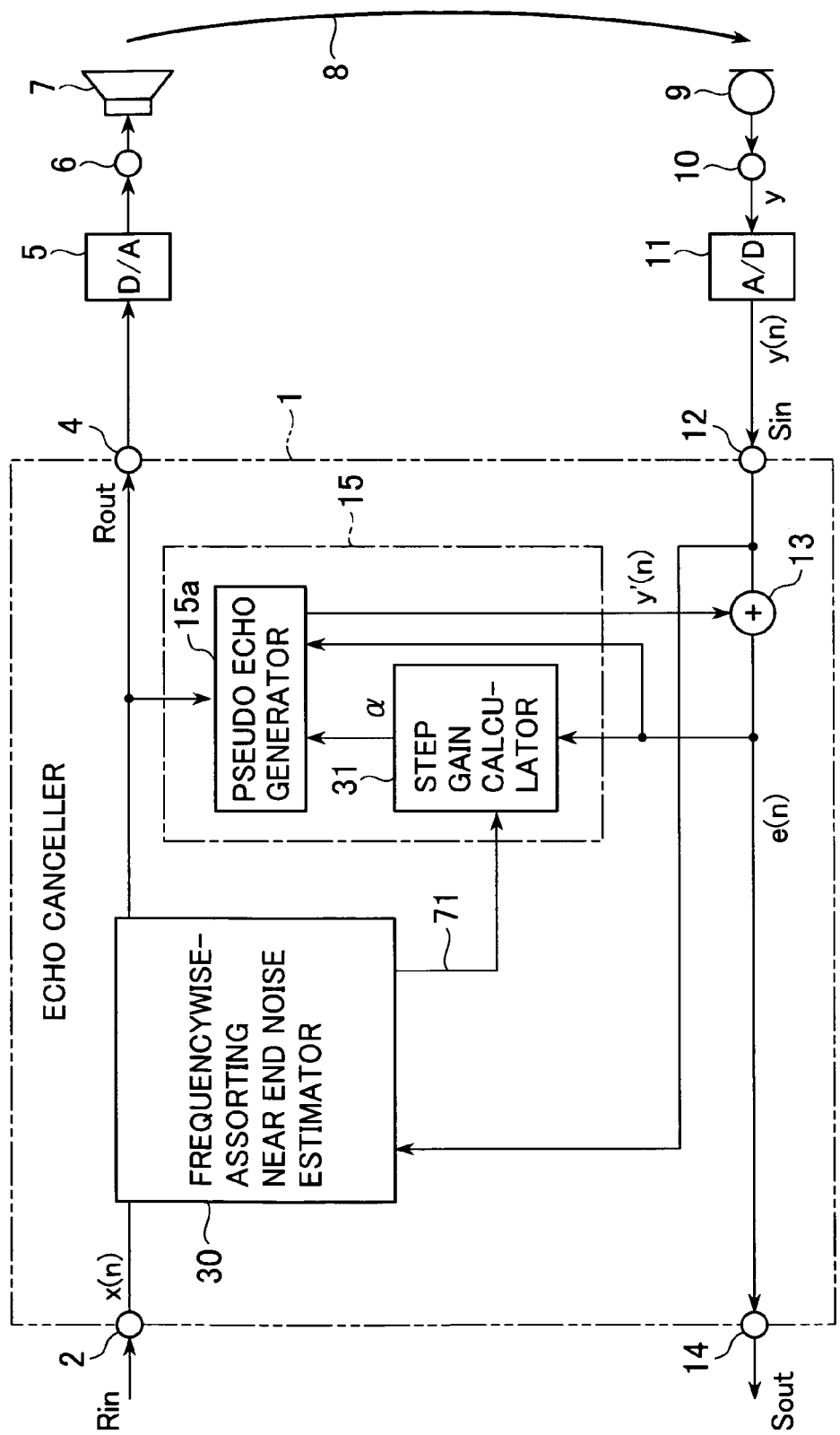
FIG. 10 is a schematic block diagram, like FIG. 1, showing the configuration of the echo canceller and its peripheral components of a third embodiment.

Next, an echo canceller in accordance with the third embodiment of the present invention will be described. FIG. 10 is a schematic block diagram showing the configuration of the echo canceller 1 and peripheral components of the third embodiment.

With reference to FIG. 10, the third embodiment may be the same as the first embodiment except for a frequencywise-assorting near end noise estimator 30 and a step gain calculator 31 in place of the near end noise estimator 3 and the step gain calculator 15b of the adaptive filter 15, respectively.

The remaining components and elements may be the same as the first embodiment. A description will be made to the third embodiment with the function and configuration unique thereto focused.

The frequencywise-assorting near end noise estimator 30 serves as calculating the power Pn of only the near end noise and the power Psn of a signal including the echo and the near end noise in a manner described below on the basis of the power of a predetermined plurality of frequency components to send the power to the step gain calculator 31.

The step gain calculator 31 is operative in response to the signal power Pn and Psn from the frequencywise-assorting near end noise estimator 30 to calculate the step gain for use in the pseudo echo generator 15a to output the step gain to the pseudo echo generator 15a.

Figure 11:
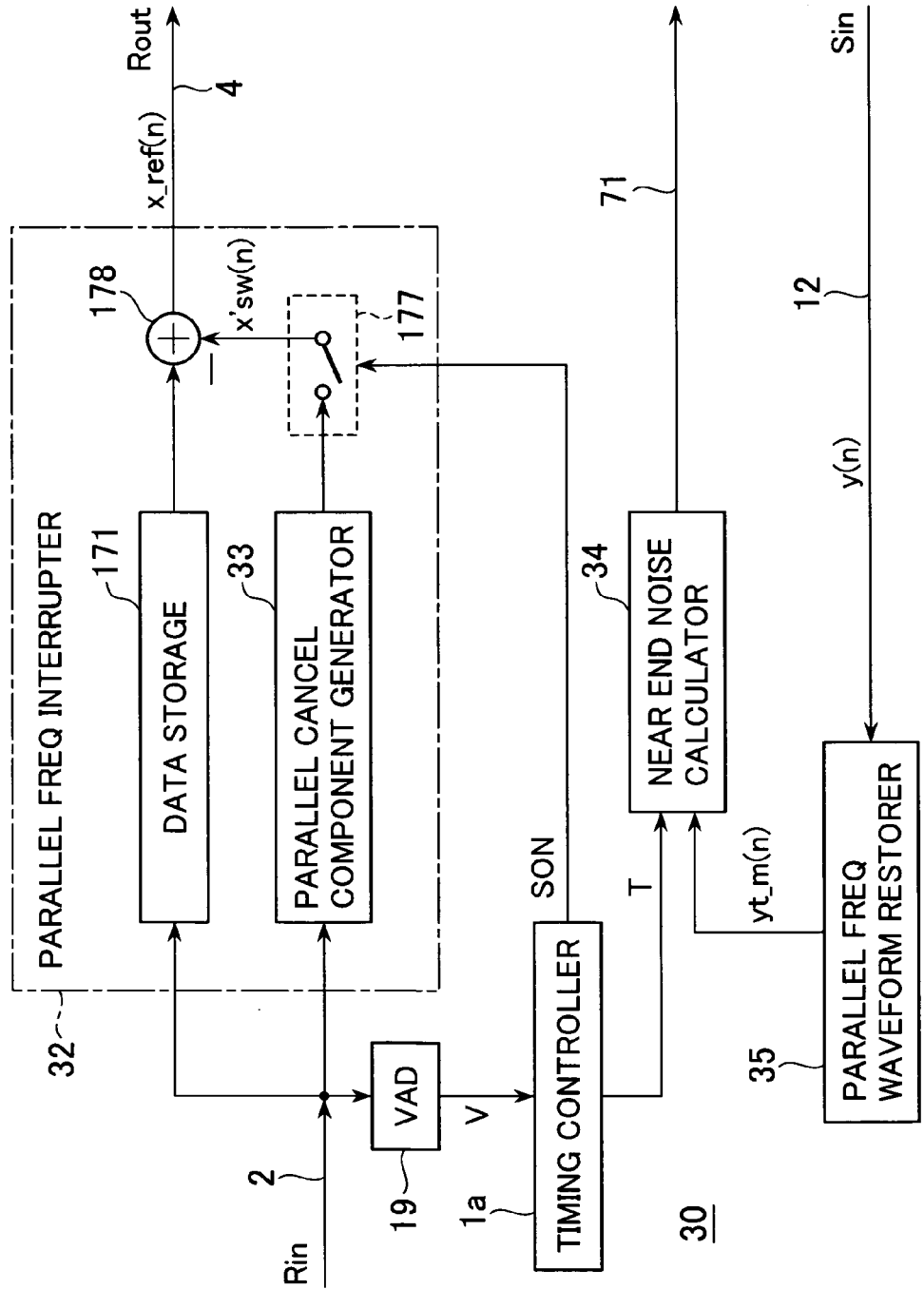
FIG. 11 is a schematic block diagram showing the internal configuration of the near end noise estimator of the third embodiment.

With reference to FIG. 11, the function and configuration of the frequencywise-assorting near end noise estimator 30 will be described. The heavy lines shown in FIG. 11 indicate that the plurality of frequency components are conveyed.

In FIG. 11, the frequencywise-assorting near end noise estimator 30 includes at least a parallel frequency interrupter 32, a parallel frequency waveform restorer 35 and a near end noise calculator 34 in addition to the VAD 19, the timing controller 1a, which are interconnected as illustrated.

The parallel frequency interrupter 32 is adapted to periodically eliminate each of the plurality of specific frequency components in the audio signal x(n) inputted from the receiver input terminal 2, and outputs a signal having the plurality of specific frequency components periodically interrupted. The parallel frequency interrupter 32, as shown in FIG. 10, includes a parallel cancel component generator 33 in addition to the data storage 171, the switch 177 and the component cancel adder 178.

The parallel frequency waveform restorer 35 is adapted to extract the plurality of specific frequency components interrupted by the parallel frequency interrupter 32 to restore the signal waveform of each of the plurality of specific frequency components. The parallel frequency waveform restorer 35 delivers the signal waveform of each of the specific frequency components to the near end noise calculator 34.

Figure 12:
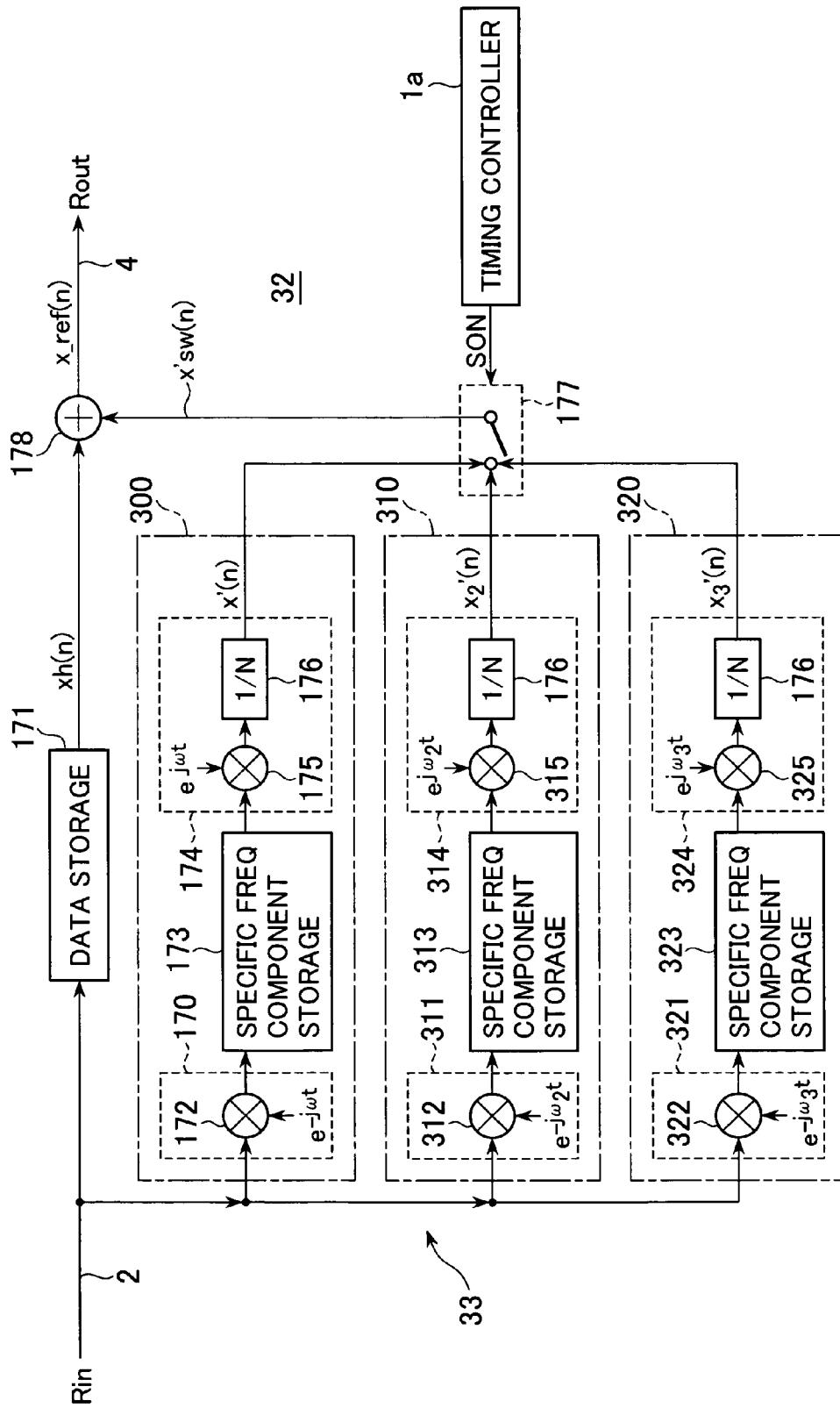
FIG. 12 is a schematic block diagram showing the internal configuration of the parallel cancel component generator of the third embodiment.

With reference to FIG. 12, the internal configuration of the parallel frequency interrupter 32 will be described in detail. The figure particularly shows in detail the internal configuration of the parallel cancel component generator 33.

With the instant embodiment, in order to eliminate three frequency components different from each other in the audio signal x(n) at the same timing, the parallel cancel component generator 33 is specifically adapted to generate those frequency components. The parallel cancel component generator 33 is connected to the switch 177, which is operative in response to the signal SON to be turned on or off from the same timing controller 1a.

As seen from FIG. 12, the parallel cancel component generator 33 includes a first, a second and a third cancel frequency component generator 300, 310 and 320, which are interconnected as illustrated.

The first, second and third cancel frequency component generators 300, 310 and 320 generate respective frequency components different from each other in the same manner by the same internal configuration as the first embodiment.

For example, the first cancel frequency component generator 300 includes the receiver side time-to-frequency converter 170 including the DFT transformer 172, the receiver side specific frequency component storage 173, and the receiver side frequency-to-time converter 174 including the inverse DFT transformer 175 and the normalizer 176. Similarly, the second and third cancel frequency component generators 310 and 320 respectively include receiver side time-to-frequency converters 311 and 321 including DFT transformers 312 and 322, receiver side specific frequency component storages 313 and 323, and receiver side frequency-to-time converters 314 and 324, which include inverse DFT transformers 315 and 325, respectively, and the respective normalizers 176.

Figure 13:
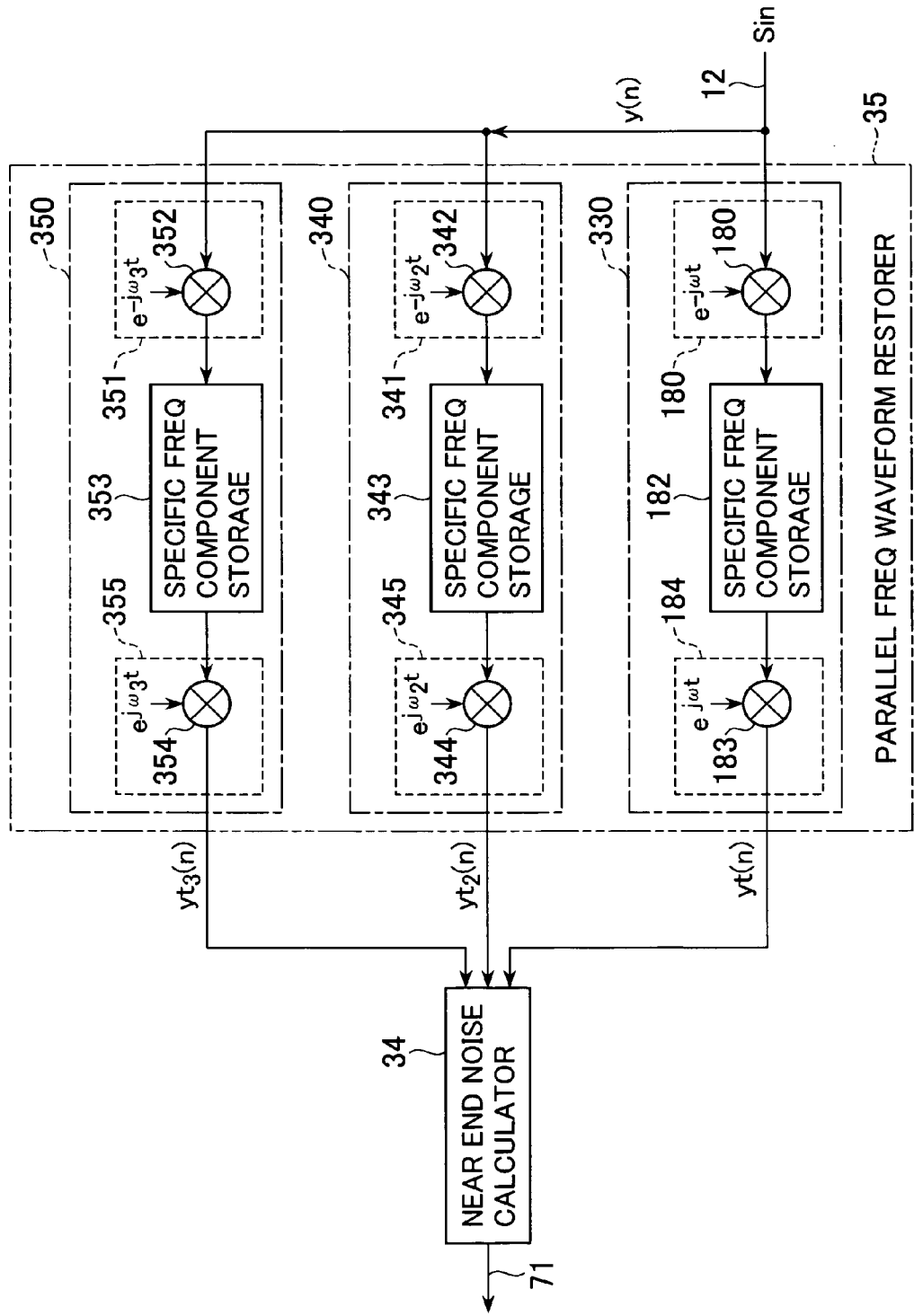
FIG. 13 is a schematic block diagram showing the internal configuration of the parallel frequency waveform restorer of the third embodiment.

FIG. 13 is a schematic block diagram showing the configuration of the parallel frequency waveform restorer 35 in detail. In the figure, the parallel frequency waveform restorer 35 includes a first, a second and a third component waveform restorer 330, 340 and 350, which are interconnected as depicted.

The first, second and third component waveform restorers 330, 340 and 350 are adapted to restore respective frequency components different from each other in the same manner by the same internal configuration as the first embodiment.

For example, the first component waveform restorer 330 includes the transmitter side time-to-frequency converter 180 including the DFT transformer 181, the transmitter side specific frequency component storage 182, and the transmitter side frequency-to-time converter 184 including the inverse DFT transformer 183. Similarly, the second and third component waveform restorers 340 and 350 respectively include transmitter side time-to-frequency converters 341 and 351 respectively including DFT transformers 342 and 352, transmitter side specific frequency component storages 343 and 353, and transmitter side frequency-to-time converters 345 and 355 respectively including inverse DFT transformers 344 and 354. Those components are interconnected as shown.

In operation, as shown in the audio signal x(n) inputted from the receiver input terminal 2 is transferred to the parallel cancel component generator 33, FIG. 11. In the parallel cancel component generator 33, the audio signal x(n) is inputted to the first, second, and third cancel frequency component generators 300, 310, and 320. Then, the first, second, and third cancel frequency component generators 300, 310, and 320 generate frequency components different from each other at the same timing and send the plurality of, three, frequency components to the switch 177 at the same timing.

In the component cancel adder 178, the audio signal x(n) from the data storage 171 and the plurality of frequency components from the parallel cancel component generator 33 are cancel-added to thereby output the reference signal x_ref (n) having the plurality of frequency components periodically interrupted.

With reference to FIG. 12, the first cancel frequency component generator 300, similarly to the first embodiment, generates a signal X'(n) of the first frequency component in the audio signal x(n). In the third embodiment, for example, the first frequency component has a frequency ω. A manner for generating the first frequency component may be similar to the first embodiment and will therefore be not described in detail again.

The second cancel frequency component generator 310 generates the second frequency component X2'(n) in the audio signal x(n). The second frequency component has a frequency different from the first frequency ω, for example, and has a second frequency ω2.

The third cancel frequency component generator 320 generates the third frequency component X3'(n) in the audio signal x(n). The third frequency component has a frequency different from the first and second frequencies, for example, and has a third frequency ω3.

In the instant third embodiment, the first, second, and third frequencies ω, ω2, and ω3 are set to, for example, 1 kHz, 2 kHz, and 3 kHz, respectively, which may not be restrictive.

In respect of how to select the first, second, and third frequencies ω, ω2, and ω3, it is important to select frequencies capable of being expected to cause the frequency masking effect for voice, and the frequencies may not be restricted to particular values.

For example, the above-described frequencies (1 kHz, 2 kHz, and 3 kHz) selected in the third embodiment relies upon the nature that the frequency characteristic of a voice signal has its harmonic structure typically higher in power at the basic frequency and its multiplied frequencies.

Respective signals X'(n), X2'(n), and X3'(n) of the frequency components are outputted through the switch 177 to the component cancel adder 178. The switch 177 and the component cancel adder 178 may, of course, operate similarly those of the first embodiment.

Then, the signal x_ref(n) outputted from the component cancel adder 178 through the receiver output terminal 4 is emitted by the loudspeaker 7 as an audible sound.

The signal y(n) produced by the microphone 9 and digital-converted is inputted through the transmitter input terminal 12 to the parallel frequency waveform restorer 35. With reference to FIG. 13, the digital signal y(n) inputted from the transmitter input terminal 12 is transferred to the first, second, and third component waveform restorers 330, 340, and 350.

The first component waveform restorer 330 receives the digital signal y(n) from the transmitter input terminal 12 and extracts the frequency component of the first frequency ω to produce a signal waveform yt(n) of the first frequency component. The second component waveform restorer 340 receives the digital signal y(n) from the transmitter input terminal 12 and extracts the frequency component of the second frequency ω2 to produce a signal waveform yt2($n$) of the second frequency component. The third component waveform restorer 350 receives the digital signal y(n) from the transmitter input terminal 12 and extracts the frequency component of the third frequency ω3 to produce a signal waveform yt3($n$) of the third frequency component.

The first, second, and third component waveform restorers 330, 340, and 350 may operate similarly to the frequency waveform restorer 18, FIG. 2, of the first embodiment except for the respective first, second, and third frequencies ω, ω2, and ω3 different from each other as described above.

Now, the frequency component reproduced by the parallel frequency waveform restorer 35 has the same frequency as the parallel frequency interrupter 32 on the receiver path side.

Additionally, the parallel frequency waveform restorer 35 is adapted for providing three component waveform restorers. However, the number of these restorers may not be restricted to three but need to be equal to the number of cancel frequency component generators on the receiver path side.

The signals yt(n), yt2($n$), and yt3($n$) having frequency components of the respective frequencies eliminated from the parallel frequency waveform restorer 35 are inputted to the near end noise calculator 34. The near end noise calculator 34 calculates the signal power Pn of the near end noise and the total signal power Psn of the echo and the near end noise on the basis of the inputted signals yt(n), yt2($n$), and yt3($n$) in a manner similar to that in the first embodiment.

In the present third embodiment, the near end noise calculator 34 calculates the signal power Pn of the near end noise and the total signal power Psn of the echo and the near end noise in three kinds of frequencies different from each other.

The near end noise calculator 34 uses, when receiving yt(n) from the first component waveform restorer 330, this yt (n) to calculate the signal power Pn_1 of the near end noise and the total signal power Psn_1 of the echo and the near end noise in a manner similar to the first embodiment.

The near end noise calculator 34 also uses yt2(n) and yt3(n) from the second and third component waveform restorers 340 and 350 to calculate the signal power Pn_2 and Pn_3 of the near end noise and the total signal power Psn_2 and Psn_3, respectively, of the echo and the near end noise.

Figure 14A:
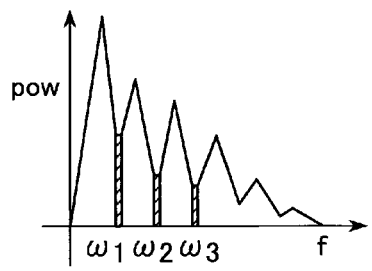
FIGS. 14A to 14F show frequency spectra useful for understanding calculation of a step gain in the step gain calculator of the third embodiment.
Figure 14B:
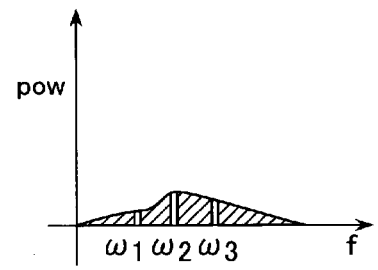
Figure 14C:
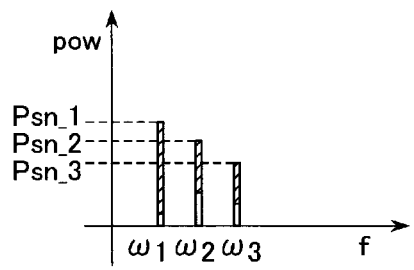
Figure 14D:
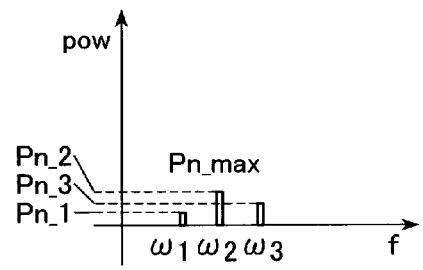
Figure 14E:
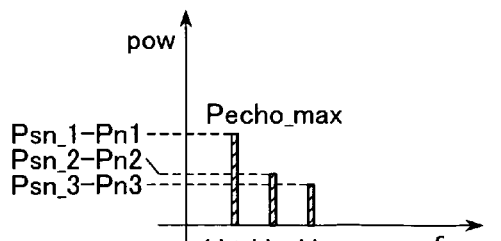
Figure 14F:
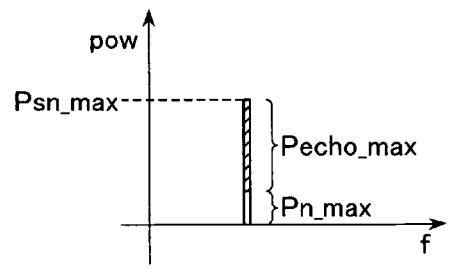

Now, FIGS. 14A to 14F are graphs useful for understanding how to calculate an audio frequency component and a noise frequency component. In FIGS. 14A to 14E, the vertical and horizontal axes represent signal power and a frequency, respectively. In FIG. 14F, the vertical axis represents signal power.

FIG. 14A plots the frequency characteristic of the signal outputted from the loudspeaker 7. As clear from FIG. 14A, the audio signal outputted from the loudspeaker 7 has frequency components of frequencies ω (=ω1), ω2, and ω3 eliminated. FIG. 14B plots the frequency characteristic of the near end noise and particularly shows frequency components of frequencies ω1, ω2, and ω3 which are to be extracted from the near end noise waveform.

FIGS. 14C and 14D are graphs useful for understanding the output of the parallel frequency waveform restorer 35. The audio signal outputted from the loudspeaker 7 may partly be transmitted as the echo over the acoustic echo path 8 and captured by the microphone 9.

At this time, when the echo includes those frequency components, the near end noise calculator 34 finds the total power Psn_1 to Psn_3 of frequency components of the echo and the near end noise in the respective frequency components as shown in FIG. 14C to output the total power to the step gain calculator 31.

By contrast, when the echo does not include those frequency components, the near end noise calculator 34 finds the power Pn_1 to Pn_3 of only frequency components of the near end noise as shown in FIG. 14D to output the power to the step gain calculator 31.

Next, it will be described how the step gain calculator 31 operates to calculate the step gain by on the basis of a result of the calculation from the near end noise calculator 34. The step gain calculator 31 calculates the maximum value Pn_max of each frequency component power, i.e. near end noise component power, of the near end noise received from the near end noise calculator 34 according to, for example, an expression (26).

$$Pn\_max = MAX(Pn\_j)(j=1,2,3) \quad (26)$$

In the expression (26), MAX ( ) is a function for finding the maximum value of the variable between the parentheses. In the expression (26), the maximum value of the power among Pn_1, Pn_2, and Pn_3 is referred to as Pn_max. In an example shown in FIG. 14D, the power Pn_2 of the frequency component of a frequency ω2 is the maximum value Pn_max.

Next, the step gain calculator 31 finds the maximum value Pecho_max of estimated echo power on the basis of Pn_1 to Pn_3 and Psn_1 to Psn_3 in each frequency component from the near end noise calculator 34. Now, the step gain calculator 31 finds the maximum value Pecho_max of the estimated echo power according to, for example, an expression (27).

$$Pecho\_max = MAX(Psn\_j - Pn\_j)(j=1,2,3) \quad (27)$$

According to the expression (27), the step gain calculator 31 finds differences between Psn and Pn for each of the frequency components to determine the maximum of the differences as the maximum value Pecho_max of the estimated echo power.

In an example shown in FIG. 14E, since a difference between Psn_1 and Pn_1 in the frequency ω1 is maximum, the value (Psn_1−Pn_1) at this frequency ω1 is determined as the maximum value Pecho_max of the estimated echo power.

Furthermore, the step gain calculator 31 finds the pseudo maximum total power, namely, the maximum value Psn_max of the total power of pseudo near end noise component power and estimated echo component power on the basis of the maximum value Pn_max of the near end noise component power and the maximum value Pecho_max of the estimated echo power. The step gain calculator 31 finds Psn_max according to, for example, an expression (28).

$$Psn\_max = Pn\_max + Pecho\_max \quad (28)$$

For example, FIG. 14F is a graph useful for understanding the process of calculating the pseudo maximum total power Psn_max As seen from FIG. 14F, the pseudo maximum total power Psn_max is a sum of the maximum value Pn_max of the near end noise component power and the maximum value Pecho_max of the estimated echo power.

Then, the step gain calculator 31 finds a step gain α3 according to an expression (29) instead of the expression (10) for use in the first embodiment and outputs this step gain α3 as the step gain α to the pseudo echo generator 15a.

$$\alpha 3 = \exp\left\{\left(\frac{P_{echo\_max}}{P_{sn\_max}} - 1\right)\right\} \quad (29)$$

In the expression (29) also, the base of the exponential function may be set to a constant a more than unity.

In consideration of the near end noise not always having a flat frequency characteristic, the third embodiment is adapted to allow the echo canceller 1 to provide its performance so as to deal with this problem.

For example, when a drive-line machine such as an electric motor or an engine resides around the microphone 9, it may cause the near end noise strongly depending on the rotational rate of the machine. Often, such noise has the peak noise frequency appearing around the frequency corresponding to the rotational rate, thus not rendering its frequency characteristic flat.

On the other hand, the human voice generally has its frequency characteristic in which the peak appears, for example, around 1 kHz from which the frequency components gradually decrease toward the higher region.

Noise from a noise source around the microphone 9 may be generated by various causes. Therefore, not only natural noise not random in terms of period but also noise such as mechanical noise having the characteristic as described above may partly be captured by the microphone 9.

In such a case, in the first embodiment where only one specific frequency is eliminated to thereby estimate the near end noise, the near end noise may be underestimated in the case of another frequency having a large component in the near end noise to set the step gain of the echo canceller 1, thus possibly causing the performance of echo elimination to be deteriorated.

In the third embodiment, however, instead of simply using the entire power of the respective frequency components, the influence of a part having the largest echo component and a part having the largest near end noise component is calculated to reflect the result therefrom. Therefore, the net component can be reflected in coefficient control in the echo canceller 1 to set the step gain controlling convergence adjusted to the near end noise environment and the intensity of the echo, thus making it possible to rapidly and accurately eliminate the echo.

In short, in the third embodiment, the parallel frequency interrupter 32 utilizes the frequency masking effect so as to eliminate the plurality of frequency components in the audio signal, and then outputs the signal to the loudspeaker 7. On the transmitter path side, the parallel frequency waveform restorer 35 reproduces waveforms of the above-described plurality of frequency components, and the near end noise calculator 34 finds the power of the near end noise and the total power of the echo and the near end noise in the respective frequencies. Then, the step gain calculator 31 finds the step gain of the echo canceller 1 on the basis of the maximum value of the near end noise power and the maximum value of the estimated echo power.

As a result, according to the third embodiment, the state of the echo and the near end noise dominantly affecting the echo canceller 1 can be calculated more accurately, and can be reflected in the step gain controlling convergence of the echo canceller 1. Therefore, the echo canceller 1 can be more rapidly and accurately operative in response to an acoustic environment in the near end talker side to improve phone call quality.

(D) Fourth Embodiment

Figure 15:
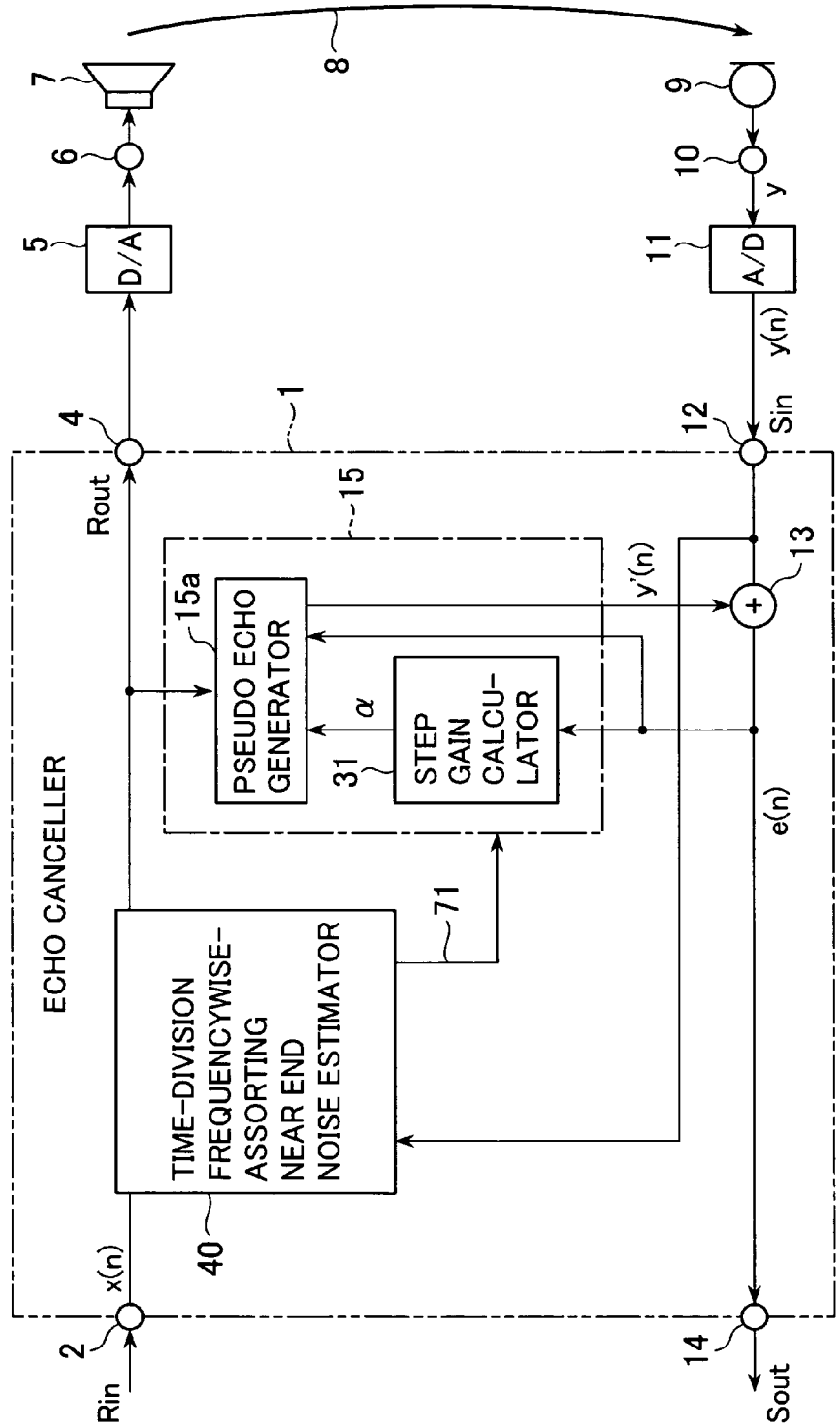
FIG. 15 is a schematic block diagram, like FIG. 1, showing the configuration of an echo canceller and its peripheral components of a fourth embodiment.

Next, description will be made on an echo canceller in accordance with the fourth embodiment of the invention. FIG. 15 is a schematic block diagram showing the configuration of the echo canceller 1 and peripheral components of the fourth embodiment. In the fourth embodiment, generally, the near end noise estimator 3 of the first embodiment is replaced with a time-division frequencywise-assorting near end noise estimator 40, and the step gain calculator 31 of the third embodiment is provided. The remaining components and elements may be the same as the first embodiment. The function and configuration unique to the fourth embodiment will be mainly described below.

The time-division frequencywise-assorting near end noise estimator 40 is adapted to set a specific frequency which is different from time to time and periodically eliminate the component corresponding to that frequency from the audio signal x(n), and to extract, on the transmitter path side, the eliminated frequency component to find the power of the near end noise.

Figure 16:
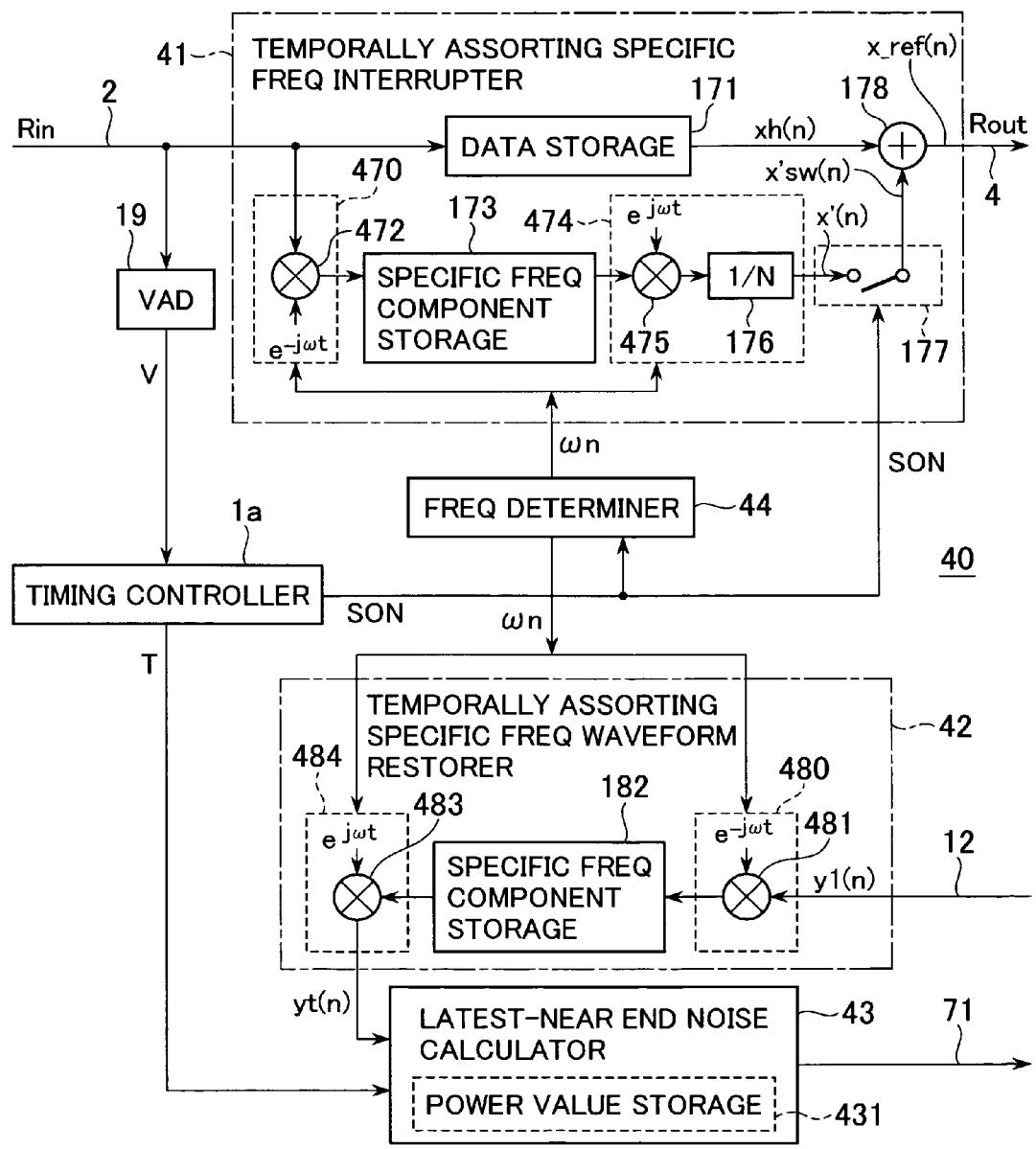
FIG. 16 is a schematic block diagram showing the internal configuration of the time-division frequencywise-assorting near end noise estimator of the fourth embodiment.

FIG. 16 schematically shows the internal configuration of the time-division frequencywise-assorting near end noise estimator 40 of the fourth embodiment. The time-division frequencywise-assorting near end noise estimator 40 of the fourth embodiment includes at least a temporally assorting specific frequency interrupter 41, a temporally assorting specific frequency waveform restorer 42, a latest-near end noise calculator 43 and a frequency determiner 44, in addition to the VAD 19 and the timing controller 1a. Those components are interconnected as shown.

The frequency determiner 44 is adapted to receive the timing signal SON from the timing controller 1a, and output a frequency ωn of a specific frequency to the temporally assorting specific frequency interrupter 41 and the temporally assorting specific frequency waveform restorer 42.

The temporally assorting specific frequency interrupter 41 is adapted to set the frequency ωn designated by the frequency determiner 44 as the specific frequency and eliminate the component of the specific frequency in the audio signal x(n). The temporally assorting specific frequency interrupter 41 may basically have the same configuration as the first embodiment except for a receiver side time-to-frequency converter 470 and a receiver side frequency-to-time converter 474 in place of the receiver side time-to-frequency converter 170 and the receiver side frequency-to-time converter 174, respectively.

The temporally assorting specific frequency waveform restorer 42 serves as setting the frequency designated by the frequency determiner 44 as the specific frequency and eliminating the frequency component corresponding to the specific frequency in the signal y(n) from the transmitter input terminal 12 to reproduce a resultant waveform. The temporally assorting specific frequency waveform restorer 42 may basically have the same configuration as the first embodiment except for a transmitter side time-to-frequency converter 480 and a transmitter side frequency-to-time converter 484 in place of the transmitter side time-to-frequency converter 180 and the transmitter side frequency-to-time converter 184, respectively.

The latest-near end noise calculator 43 functions as calculating the near end noise power similarly to the first embodiment. The latest-near end noise calculator 43 will be described in detail later on.

With reference to FIG. 15, the audio signal x(n) from the receiver input terminal 2 is inputted to the time-division frequencywise-assorting near end noise estimator 40. The time-division frequencywise-assorting near end noise estimator 40 selects a different frequency as the specific frequency for each period and outputs a reference signal having the specific frequency component eliminated in the inputted audio signal x(n).

Now, the time-division frequencywise-assorting near end noise estimator 40 changes, after receiving the audio signal x(n), the specific frequency for estimating the near end noise from time to time, i.e. for each period.

On the transmitter path side, the time-division frequencywise-assorting near end noise estimator 40 extracts the same specific frequency component as on the receiver path side from the signal y(n) inputted from the transmitter input terminal 12, and finds the near end noise power on the basis of this specific frequency component to output this power to the step gain calculator 31.

In FIG. 16, the audio signal x(n) from the receiver input terminal 2 is inputted to the VAD 19 and the temporally assorting specific frequency interrupter 41. The VAD 19 will operate in the similar fashion to the first embodiment.

The VAD 19 sends, when detecting a voice activity from the received signal, the voice activity detection signal v to the timing controller 1a. Then, the timing controller 1a sends the signal SON to the temporally assorting specific frequency interrupter 41 and the frequency determiner 44. This signal SON is outputted each time the VAD 19 detects a voice activity in the received signal, as in the first embodiment.

The frequency determiner 44 changes, each time receiving the signal SON, an output designation frequency ωn to output the changed frequency to the temporally assorting specific frequency interrupter 41 and the temporally assorting specific frequency waveform restorer 42.

It will now be described how the frequency determiner 44 determines the output designation frequency ωn. To the frequency determiner 44, such a manner is applicable in which an initial value is set in advance to the frequency, which is increased or decreased by a predetermined value each time the signal SON is received from the timing controller 1a.

With reference to FIG. 17, it will be described how specifically the fourth embodiment determines the output designation frequency ωn. FIG. 17 shows table data for use in determining the output designation frequency ωn by the frequency determiner 44.

In FIG. 17, for example, the initial value of the output designation frequency ωn is set to 1.0 kHz, and then, each time the signal SON is received from the timing controller 1a, the next output designation frequency is set to a frequency obtained by adding 1 kHz to the last output designation frequency, which may the initial value when the signal SON is received first time. When the output designation frequency ωn reaches its upper limit value, for example, 3.0 kHz, it returns to 1.0 kHz in order to change the output designation frequency ωn.

As above, the frequency determiner 44 can be implemented by being provided with a plurality of frequencies in advance and selecting the output designation frequency ωn in a predetermined order each time the signal SON is received. In the fourth embodiment, for example, the upper limit value of the circulating frequencies may be set to 3.0 kHz, and three predetermined frequencies may be provided. However, these may not be restrictive.

Additionally, the initial value of the output designation frequency can is set to 1.0 kHz, and the step width of changing the frequencies is equal to 1.0 kHz. However, these values are not restrictive either.

The temporally assorting specific frequency interrupter 41 interruptedly eliminates, similarly to the first embodiment, the specific frequency component in the inputted audio signal x(n). Furthermore, in the fourth embodiment, the temporally assorting specific frequency interrupter 41 interruptedly eliminates the frequency component of the frequency con designated by the frequency determiner 44 from the audio signal x(n). So far as the elimination of the frequency component is concerned, the specific frequency interrupter 41 may operate similarly to the first embodiment.

Also similarly to the first embodiment, the temporally assorting specific frequency waveform restorer 42 operates to extract the specific frequency component in the signal y(n) inputted from the transmitter input terminal 12. Furthermore, the temporally assorting specific frequency waveform restorer 42 extracts the frequency component of the frequency can designated by the frequency determiner 44 to restore the waveform. The operation for restoring the waveform of the frequency component may be the same as the first embodiment.

The waveform yt(n) restored by the temporally assorting specific frequency waveform restorer 42 is inputted to the latest-near end noise calculator 43. As described above, the temporally assorting specific frequency waveform restorer 42 restores the waveform of the frequency component of the frequency can recursively changed by the frequency determiner 44.

The latest-near end noise calculator 43 calculates the power Pn and Psn of the frequency component of the frequency can thus recursively changed. The latest-near end noise calculator 43 stores the power Pn of the near end noise, and the total power Psn of the echo and the near end noise of each frequency component in a power value storage 431. The stored data will be held until the frequency con circulates once, unlike the first embodiment.

Then, when the frequency ωn circulate once, the latest-near end noise calculator 43 delivers a combination of the power Pn of the near end noise and the total power Psn of the echo and the near end noise of each frequency ωn held in the power value storage 431 to the step gain calculator 31.

At this time, the power Pn of the near end noise and the total power Psn of the echo and the near end noise are updated in the power value storage 431 to a combination of the latest values in respect of the frequencies ω1 to ω3.

More specifically, the previous values of the power Pn of the near end noise and the total power Psn of the echo and the near end noise are overwritten with the latest calculated values. Then, a combination of the values Pn and Psn in respect of the combination of three frequencies is outputted to the step gain calculator 31. The step gain calculator 31 may operate in the same manner as the third embodiment.

According to the fourth embodiment as described above, the volume of the device and software can be reduced as described below. In the third embodiment, the predetermined plurality of frequencies are simultaneously eliminated and restored. Therefore, the much more frequencies to be eliminated cause the calculation process to increase in volume. Namely, in order to improve the performance of the echo canceller 1, more sophisticate analysis on the detailed frequency characteristic of the near end noise could render the calculation massive.

In view of those circumstance, the fourth embodiment includes the frequency determiner 44 adapted to circularly select the frequency to be eliminated, and the temporally assorting specific frequency interrupter 41 and the temporally assorting specific frequency waveform restorer 42 adapted to eliminate and restore the frequency component in respect to the selected frequency, wherein the latest-near end noise calculator 43 temporarily holds the values Pn and Psn of each frequency to output a combination of the latest power of each frequency to the step gain calculator 31. Thus, the calculation for eliminating the plurality of frequencies may not simultaneously be performed. Similarly, on the transmitter path side, the restoring calculation may not be executed for the waveforms of the plurality of frequencies.

More specifically, in the fourth embodiment, the function for calculating the step gain from the near end noise power of the plurality of frequency components is maintained in order to find a entire feature of the frequency power of the near end noise as with the third embodiment. However, unlike the third embodiment, in one process one frequency component is eliminated. Therefore, for the calculation process for eliminating the frequency, more massive calculation and device would basically not be required than the first embodiment. Thus, the step gain of the echo canceller 1 can be circumstantially set to improve the performance of the echo elimination without increasing the software and device in size.

(E) Fifth Embodiment

Figure 18:
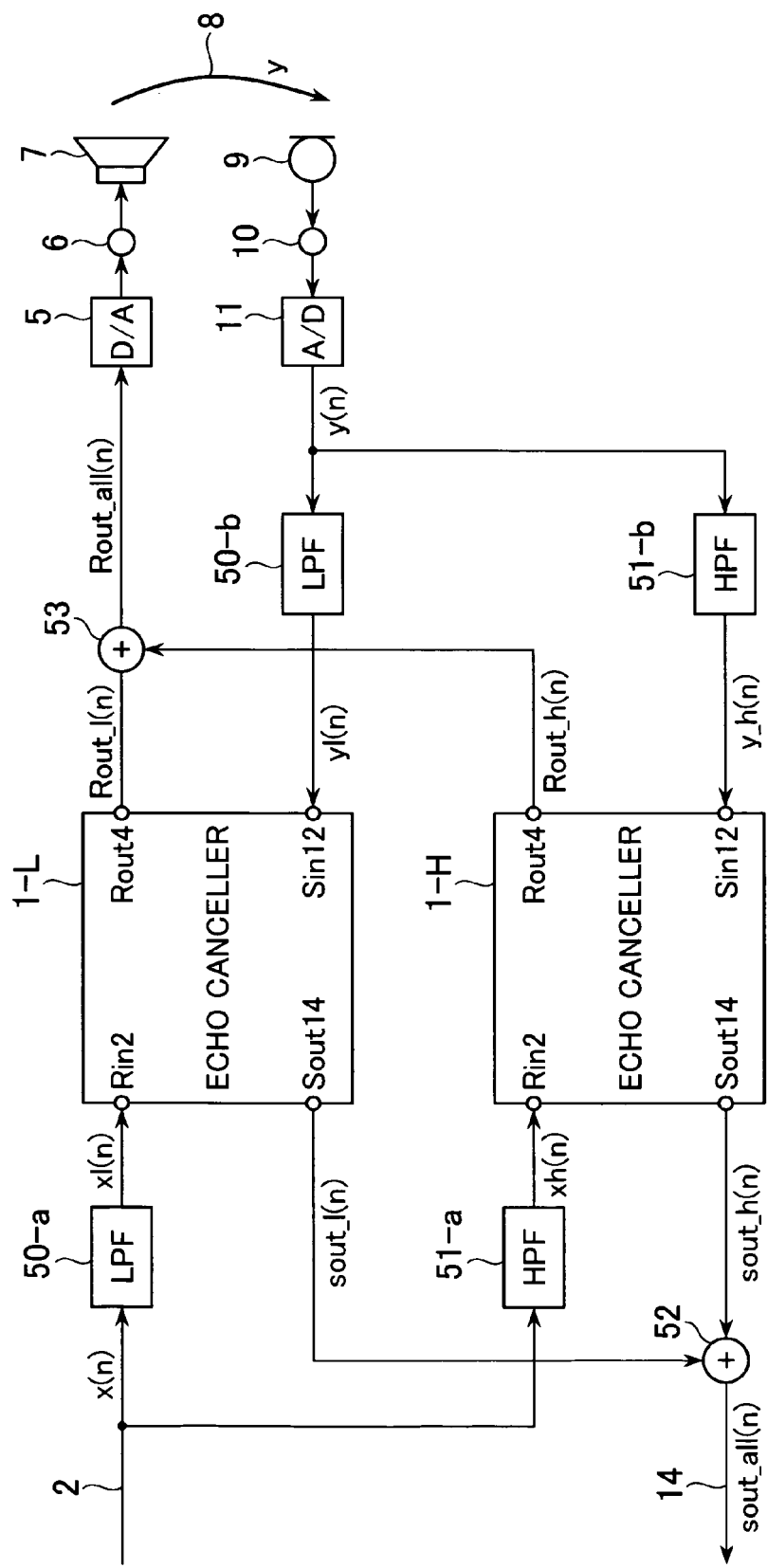
FIG. 18 is a schematic block diagram showing the configuration of the echo canceller and its peripheral components of a fifth embodiment.

Next, description will be made on an echo canceller in accordance with the fifth embodiment of the present invention. FIG. 18 shows in a schematic block diagram the configuration of the echo canceller and peripheral components of the fifth embodiment. The fifth embodiment includes at least a couple of echo cancellers 1-L and 1-H, a couple of low-pass filters (LPF) 50-a and 50-b, a couple of high-pass filters (HPF) 51-a and 51-b, a receiver side signal-combining adder 53, and a transmitter side signal-combining adder 52, in addition to the digital-to-analog converter 5, the loudspeaker 7 connected to the loudspeaker terminal 6, the microphone 9 connected to the microphone terminal 10, and the analog-to-digital converter 11. Those elements are interconnected as depicted.

The audio signal x(n) from the far end talker side is inputted to the low-pass filter 50-a and the high-pass filter (LPF) 51-a. The low-pass filter 50-a is adapted to receive the inputted audio signal x(n) to pass a signal xl(n) lower than a predetermined frequency band, and sends the resultant signal to the echo canceller 1-L.

With the instant embodiment, the low-pass filter 50-a passes, for example, frequency components lower than the half of the entire frequency band of the audio signal x(n). For example, in the case of the entire frequency components of the audio signal x(n) less than 8 kHz, the low-pass filter 50-a passes frequency components lower than 4 kHz in the entire frequency components of 0 to 8 kHz.

The high-pass filter (HPF) 51-*a* is adapted to receive the inputted audio signal x(n) to pass a signal xh(n) equal to or higher than a predetermined frequency band, and sends the resultant signal to the echo canceller 1-H.

With the embodiment, the high-pass filter 51-*a* passes, for example, frequency components equal to or higher than the half of the entire frequency band of the audio signal x(n). In the example described above of the frequency components of 8 kHz, the high-pass filter 51-*a* passes frequency components equal to or higher than 4 kHz.

The low-pass filter 50-*a* and the high-pass filter 51-*a* may have the pass bands thereof extending over any frequencies so far as the receiver side signal-combining adder 53 can rearrange the frequency band by adding the signal. Thus specific examples of the pass bands are not restrictive.

The echo canceller 1-L is adapted to eliminate the echo of the frequency component lower than the predetermined frequency band by the low-pass filter 50-*a* and the low-pass filter 50-*b*. The echo canceller 1-L may be the same in structure as the echo canceller 1 of the first embodiment.

The other echo canceller 1-H is adapted to eliminate the echo of the frequency component equal to or higher than the predetermined frequency band by the high-pass filter 51-*a* and the high-pass filter 51-*b*. Also, the echo canceller 1-H may be the same in structure as the echo canceller 1 of the first embodiment.

The receiver side signal-combining adder 53 is adapted to receive a receiver output signal Rout_l(n) from the echo canceller 1-L and a receiver output signal Rout_h(n) from the echo canceller 1-H, and add the receiver output signals Rout_l(n) and Rout_h(n) to each other to produce a resultant single signal Rout_all (n). The receiver side signal-combining adder 53 outputs the signal Rout_all(n) to the digital-to-analog converter 5.

The low-pass filter (LPF) 50-*b* is adapted to receive the signal y(n) digital-converted by the analog-to-digital converter 11 and send a signal component yl(n) lower than a predetermined frequency band to the echo canceller 1-L.

The high-pass filter (HPF) 51-*b* is adapted to receive the signal y(n) digital-converted by the analog-to-digital converter 11 and send a signal component yh(n) equal to or higher than a predetermined frequency band to the echo canceller 1-H.

The transmitter side signal-combining adder 52 is adapted for receiving a transmitter output signal Sout_l(n) from the echo canceller 1-L and a transmitter output signal Sout_h(n) from the echo canceller 1-H, and adding the transmitter output signals Sout_l(n) and Sout_h(n) to each other to transmit one signal Sout_all(n) to the far end talker side.

The fifth embodiment is thus configured by the low-pass and high-pass filters to separate the frequency band of the signal into two bands, the lower and higher bands. However, the frequency band may be separated into more than two bands.

With the present embodiment, the echo cancellers 1-L and 1-H may be implemented by the echo canceller 1 of the first embodiment. However, any of the echo cancellers 1 of the second to fourth embodiments may also be applied.

Additionally, the couple of echo cancellers 1-L and 1-H may have the same function. Alternatively, the couple of echo cancellers may have the functions different from each other.

In summary, the fifth embodiment provides the advantageous effects as follows. In the third embodiment, the near end noise components not including the echo in the predetermined plurality of frequencies are calculated to reflect a part having a large influence on the entire frequency in the step gain. However, in an application in which the near end noise component is already known as a specific source of noise, for example, a metal cutting noise or a specific frequency noise emitted from a grinder, sander or the like is already known as a dominant component of the near end noise, the echo elimination would more advantageously be processed, rather than with account taken of generally considering the entire characteristic, with the band-specific step gain independently determined in the frequency band of the dominant noise component, which may provide higher performance of the echo elimination.

The fifth embodiment is adapted, in consideration of the above, to include the low-pass and high-pass filters in addition to the configuration of the first embodiment, are provided, to separate the receiver input signal into the lower and higher bands, for each of which the signal is subjected to echo-canceling.

More specifically, the band-specific step gain is set in the frequency band including the dominant near end noise to effect the echo canceling, while the step gain based on the normal near end noise involving is set in the remaining frequency bands not including the known special near end noise to effect the echo canceling similarly to the first, second or third embodiment. That allows the echo cancellers to proceed to the operation with the step gain most optimum to the respective frequency bands to eliminate the echo. Therefore, the fifth embodiment can properly eliminate the echo even in an environment including the near end noise having a steep frequency characteristic difficult to be treated by the third embodiment.

(F) Sixth Embodiment

Figure 19:
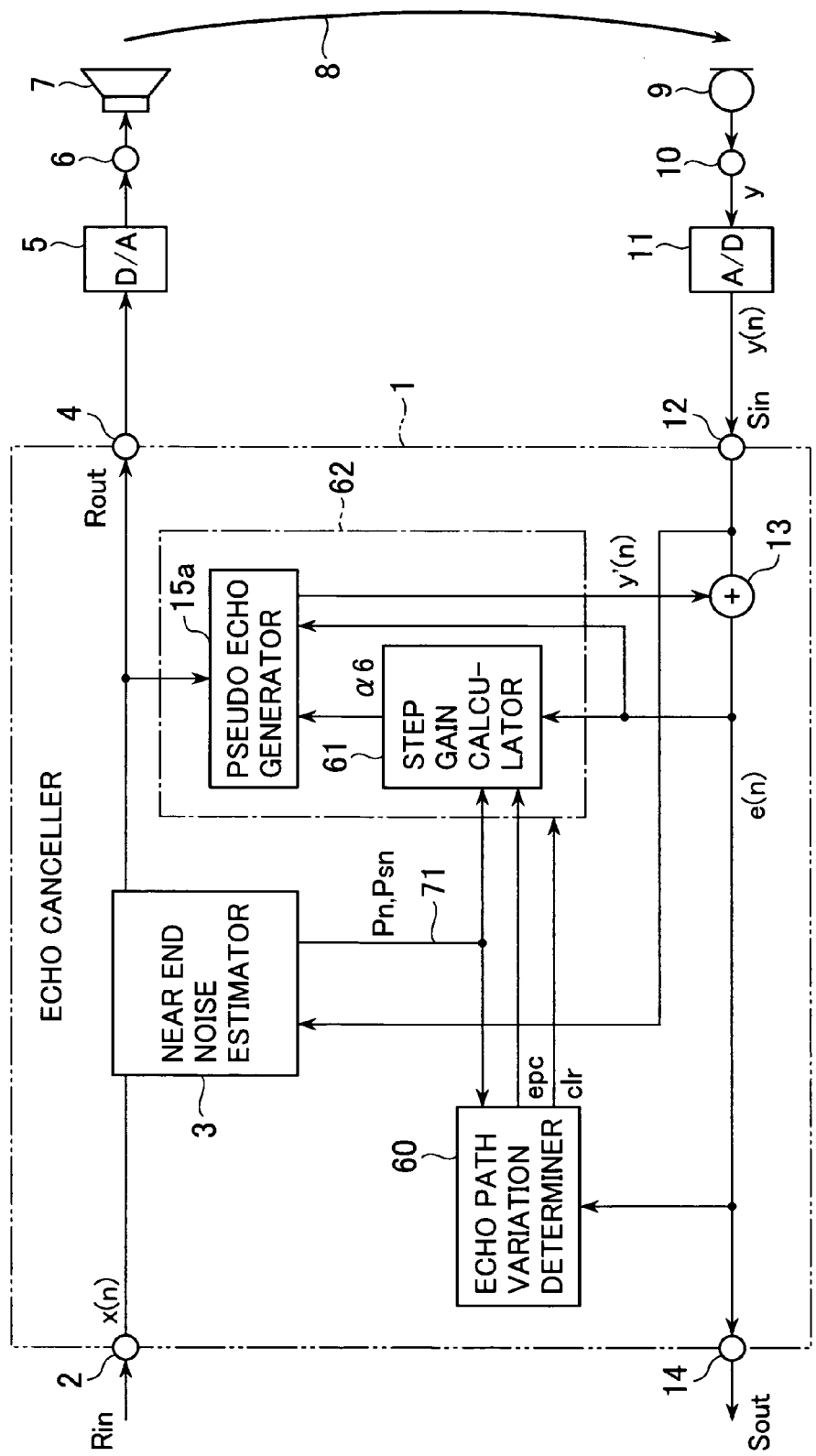
FIG. 19 is a schematic block diagram, like FIG. 1, showing the configuration of the echo canceller and its peripheral components of a sixth embodiment.

Next, an echo canceller in accordance with the sixth embodiment of the present invention will be describes. FIG. 19 is a schematic block diagram showing the configuration of the echo canceller and peripheral components of the sixth embodiment. The sixth embodiment may be the same as the first embodiment except for an echo path variation determiner 60 additionally provided, and a step gain calculator 61 in place of the step gain calculator 15*b*, as well as the function of an adaptive filter 62 applicable to the step gain calculator 61 thus provided.

The echo path variation determiner 60 is adapted to calculate a short-term average and a long-term average, of the residual signal e(n) power of the echo cancel adder 13 and the near end noise power Pn(n), detect increases in the power of the residual signal e(n) and the near end noise power Pn(n) based on differences between the short-term and long-term averages, and determine whether or not an increase in the residual signal e(n) power is caused by the near end noise power to thereby determine a variation or fluctuation on the echo path.

Figure 20:
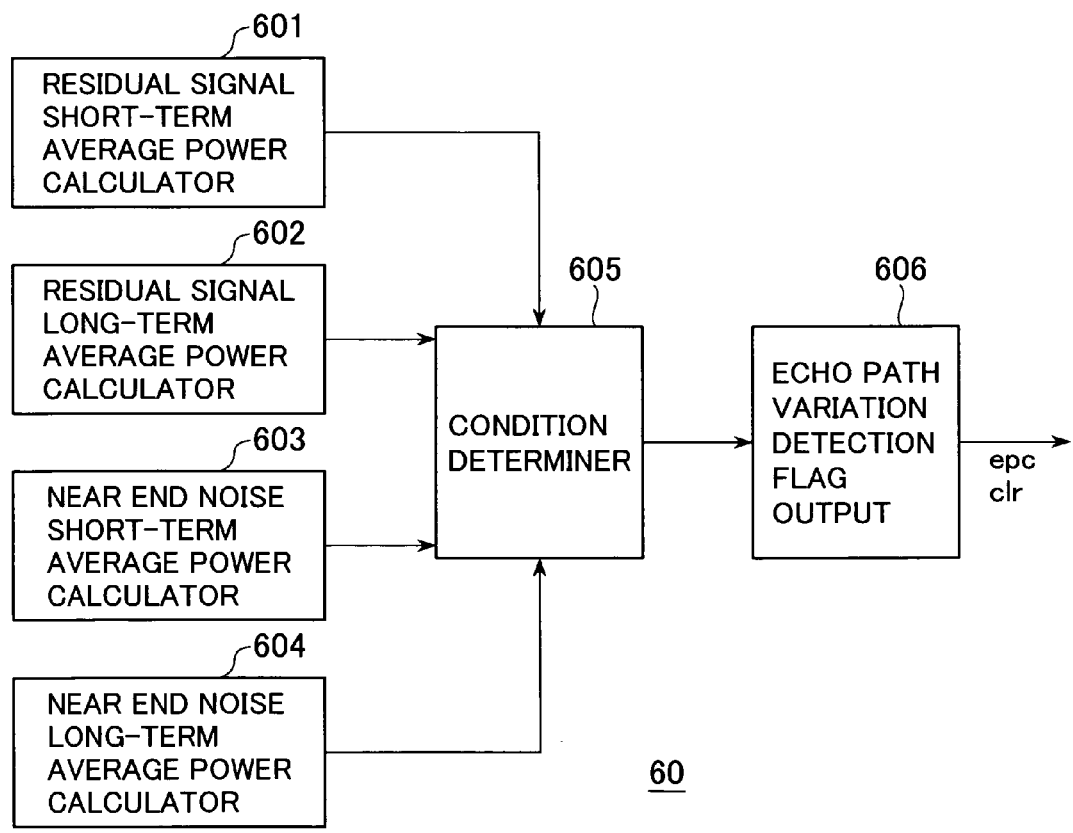
FIG. 20 is a schematic block diagram showing the internal configuration of the echo path variation determiner of the sixth embodiment.

With reference to FIG. 20, the internal configuration of the echo path variation determiner 60 will be described. As shown in the figure, the echo path variation determiner 60 includes at least a residual signal short-term average power calculator 601, a residual signal long-term average power calculator 602, a near end noise short-term average power calculator 603, a near end noise long-term average power calculator 604, a condition determiner 605, and an echo path variation detection flag output section 606, which are interconnected as illustrated.

The residual signal short-term average power calculator 601 is adapted for calculating the short-term average power of the residual signal outputted from the echo cancel adder 13. The residual signal long-term average power calculator 602 is adapted for calculating the long-term average power of the residual signal outputted from the echo cancel adder 13.

The near end noise short-term average power calculator 603 functions as calculating the short-term average power of the near end noise power Pn from the near end noise estimator 3. The near end noise long-term average power calculator 604 functions as calculating the long-term average power of the near end noise power Pn from the near end noise estimator 3.

The near end noise short-term average power calculator 603 and the near end noise long-term average power calculator 604 are adapted to hold the near end noise power Pn during a predetermined period so as to match the order of sampling between the residual signal short-term average power and the residual signal long-term average power with each other.

The condition determiner 605 functions to use the residual signal short-term average power, the residual signal long-term average power, the near end noise short-term average power and the near end noise long-term average power to determine a predetermined condition described below to thereby determine whether or not the echo path varies.

The echo path variation detection flag output section 606 is adapted to be responsive to a result of the determination of the condition determiner 605 to output a flag representative of detecting an echo path variation to the step gain calculator 61.

In operation, the echo path variation determiner 60, FIG. 19, receives the near end noise power Pn and the total power Psn of the echo and the near end noise from the near end noise estimator 3.

In the following description, in order to emphasize that the power data Pn and Psn are inputted to the echo path variation determiner 60 in the order of sampling, the power Pn and Psn will be indicated by Pn(n) and Psn (n), respectively.

The echo path variation determiner 60 also receives the residual signal e(n) from the echo cancel adder 13.

In the echo path variation determiner 60, the residual signal short-term average power calculator 601 and the residual signal long-term average power calculator 602 respectively calculate a short-term average power Pe_short(k) and a long-term average power Pe_long(k) on the basis of the inputted residual signal e(n) according to expressions (30) and (31).

Furthermore, when the near end noise short-term average power calculator 603 and the near end noise long-term average power calculator 604 receive the near end noise power Pn(n) from the near end noise estimator 3, they hold the near end noise power Pn(n) during a predetermined period in order to match the order of the samples with each other.

Then, the near end noise short-term average power calculator 603 and the near end noise long-term average power calculator 604 calculate a short-term average power Pn_short(k) and along-term average power Pn_long(k) on the basis of the inputted near end noise Pn(k) according to expressions (32) and (33), respectively.

$$P_{e\_short}(k) = (1.0 - \delta_6 s) \cdot P_{e\_short}(k-1) + \delta_6 s \cdot (e(n)^2) \quad (30)$$

$$P_{e\_long}(k) = (1.0 - \delta_6 l) \cdot P_{e\_long}(k-1) + \delta_6 l \cdot (e(n)^2) \quad (31)$$

$$P_{n\_short}(k) = (1.0 - \delta_6 s) \cdot P_{n\_short}(k-1) + \delta_6 s \cdot (Pn(n)^2) \quad (32)$$

$$P_{n\_long}(k) = (1.0 - \delta_6 l) \cdot P_{n\_long}(k-1) + \delta_6 l \cdot (Pn(n)^2), \quad (33)$$

where $0 < \delta_6 s \leq 1.0$, $0 < \delta_6 l \leq 1.0$, and l is a lower-case letter of L.

In the expressions (30) to (33), $\delta_6 s$ and $\delta_6 l$ are constants defining a response rate of averaging. When the constants $\delta_6 s$ and $\delta_6 l$ are larger, the averaging is more sensitive to a time variation but is more readily affected by background noise. Inversely, when they are smaller, the averaging mainly follows a larger time variation and is less susceptible to smaller noise. For example, in the sixth embodiment, the constants $\delta_6 s$ and $\delta_6 l$ correspond to time of 20 ms and 5 sec, respectively.

Subsequently, in the echo path variation determiner 60, the condition determiner 605 uses the residual signal short-term average power Pe_short(k), the residual signal long-term average power Pe_long(k), the near end noise short-term average power Pn_short(k) and the near end noise long-term average power Pn_long(k) to determine the conditions to thereby determine whether or not the echo path varies.

First, the condition determiner 605 determines whether or not an expression (34) is satisfied.

$$Pe\_short(k) \geq Pe\_long(k) + EPD\_m \quad (34)$$

When the expression (34) is satisfied, the condition determiner 605 determines whether or not an expression (35) is satisfied.

$$Pn\_short(k) \geq Pn\_long(k) + EPD\_m \quad (35)$$

In the expressions (34) and (35), EPD_m is a threshold value for detecting a variation in the power of a signal. For example, in the sixth embodiment, a value corresponding to EPD_m=6 dB is used. However, this specific threshold value may not be restrictive.

The satisfaction of the expressions (34) and further (35) means that both the power of the residual signal e(n) and the near end noise power Pn(n) increase. In this case, the echo path variation determiner 60 does not output anything since the power of the residual signal e(n) increases due to an increase in the near end noise power Pn(n).

By contrast, the satisfaction of the expression (34) without satisfying the expression (35) means that the power of the residual signal e(n) increases whereas the near end noise power Pn(n) does not increase. Therefore, an increase in power of the residual signal e(n) is considered to be caused by causation other than the near end noise power Pn(n), in other words, by a variation on echo path. In this case, in the echo path variation determiner 60, the echo path variation detection flag output section 606 outputs the echo path variation detection flag epc=1 to the step gain calculator 61. Otherwise, the echo path variation detection flag output section 606 outputs the echo path variation detection flag epc=0.

Further, in the case of epc=1, the echo path variation determiner 60 determines whether to satisfy an expression (36).

$$Pe\_long(k) \geq Pn\_long(k) + ADF\_clear\_m(\text{dB}), \quad (36)$$

where ADF_clear_m is a threshold value for determination of clearing a coefficient of the adaptive filter 62. For example, in the sixth embodiment, ADF_clear_m is set to 12 dB. However, this value may not be restrictive.

In the case of satisfying the expressions (34) through (36), it is represented that the residual signal e(n) power consecutively exceeds the near end noise power Pn(n) significantly.

In the case of satisfying the expressions (34) through (36), the echo path variation determiner 60 can determine with higher possibility that the current control of the step gain for updating the filter coefficient of the adaptive filter 62 cannot likely respond due to a large change in the echo path, or that the filter coefficient in itself of the adaptive filter 62 likely falls already into its improper state. Thus, in such a case, in the echo path variation determiner 60, the echo path variation detection flag output section 606 outputs a signal clr for once clearing the filter coefficient of the adaptive filter 62 to the adaptive filter 62.

When the adaptive filter 62 receives the signal clr from the echo path variation determiner 60, it once clears its filter coefficient in the adaptive filter 62.

By contrast, when the expression (36) is not satisfied, the adaptive filter 62 does not clear the filter coefficient, and thus uses the step gain α6 outputted by the step gain calculator 61 described below to update the filter coefficient of the adaptive filter 62.

Next, the operation of the step gain calculator 61 of the sixth embodiment will be described. As described above, in the case of the echo path variation detection flag epc=1, since the acoustic echo path 8 varies, the echo canceller 1 preferably responds rapidly. Needless to say, with the first embodiment also, the amounts of the echo and the near end noise are reflected on the value of the step gain, so that in the case of a variation on the acoustic echo path 8 caused by a normal, small motion of the talker on the phone or the like, the sufficient performance likely can be provided.

However, in the case of a large, rapid change on echo path caused by the near end talker under the situation where it is normally basic to perpetually move himself or herself, e.g. when driving a car or manipulating a device such as a hands-free automobile telephone or an aviation radio device, the echo canceller 1 needs to respond more rapidly to prevent an increase in echo and howling.

The sixth embodiment is adapted with the above considered. The operation of the step gain calculator 61 will be described below.

The step gain calculator 61 calculates the step gain α6 as defined by an expression (37) in response to the echo path variation detection flag epc to output the step gain to the pseudo echo generator.

$$\left. \begin{array}{l} \text{if } epc = 0, \text{ then} \\ \alpha 6 = \exp\left\{\left(\dfrac{P_{sn} - P_n}{P_{sn}}\right) - 1\right\} \\ \text{if } epc = 1, \text{ then} \\ \alpha 6 = 1.5 \end{array} \right\} \quad (37)$$

As seen from the expression (37), in the case of epc=0, the step gain α6 is the same as the expression (10) described in connection with the first embodiment, whereas in the case of epc=1, the step gain α6 is set to 1.5. The step gain α6 can be set to any large value in the range of the stability condition of the identification algorithm of the echo canceller 1, and may not be restricted to the above-described value. For example, in the sixth embodiment, since the NLMS algorithm is applied as identification algorithm, the step gain α6 may be properly determined in the range of $0 \leq \alpha 6 \leq 2.0$. Alternatively, in the case of using other algorithm, any larger value in the range of the stability condition may also be set.

In summary, in the instant sixth embodiment, the echo path variation determiner 60 is thus provided. In the case of determining that an increase in the residual signal e(n) power is not caused by the near end noise power, the echo path variation detection flag epc=1 is outputted to the step gain calculator 61. The step gain calculator 61 receives the echo path variation detection flag epc=1, it sets the step gain α6 to a larger value in the range of the stability condition of identification algorithm to quicken the convergence of the echo canceller. The echo canceller can thereby properly respond to the environment to eliminate the echo even in an environment including a frequent variation on echo path. Additionally, when the long-term average power of the residual signal e(n) exceeds the long-term average power of the near end noise by the predetermined threshold value or more, the filter coefficient of the adaptive filter 62 in the echo canceller 1 is cleared. That allows howling otherwise caused by the echo canceller 1 erroneously maintaining the improper filter coefficient to be detected and prevented to stably maintain a telephonic speech.

In the first illustrative embodiment, the transmitter side specific frequency waveform restorer 18 accurately reproduces the waveform of the specific frequency up to on the time axis, and the near end noise calculator 1b calculates the signal power during a noise period and the signal power during a period including the noise and the echo. However, in an application, for example, where a period for interrupting the frequency component by the timing controller may be prolonged, the transmitter side frequency-to-time converter 184 may be omitted to use the power in the frequency domain from the specific frequency component storage 173 instead of the power in the time domain by means of the output T from the timing controller.

In the expressions (15) to (17) of the first to sixth embodiments, K is set as a constant, but may also be set in the form of appropriate function, for example, a function outputting a positive value based on an expression (13') as an input.

$$\{(P_{sn}-P_n)/P_{sn}\}=\{Pow\_e/(Pow\_n+Pow\_e)\} \quad (13')$$

In the first to sixth embodiments, the power is used for calculating signal intensity of the noise and echo component. However, its absolute value may also be used.

The second embodiment uses two frequencies detected on the transmitter side. However, more than two frequencies may be applied.

In the third embodiment, the maximum values of the noise power and the estimated echo power are used. However, these values may not be restrictive. For example, in the case of regarding only the operational stability of the echo canceller as more important than other characteristics, average or minimum values may also be used for those values.

In the third embodiment, the step gain calculator 31 calculates the step gain according to the expression (29), which is based on the expression (10). However, on the basis of the expressions (10') to (17), similarly, the maximum values Pecho_max and Psn_max may also be used instead of (Psn-Pn) and Psn, respectively, to calculate the step gain.

In the fifth embodiment, the echo cancellers processing the lower and higher bands may be the same as the first embodiment, but may also be configured by the echo canceller of the second, third or fourth embodiment.

In the fifth embodiment, the frequency band is separated into the bandwidths equal to each other, but may also be separated into unequal bandwidths such as to cover the entire bandwidth.

In the sixth embodiment, when the long-term average power of the residual signal exceeds the long-term average power of the near end noise by the predetermined threshold value or more, the filter coefficient of the adaptive filter in the echo canceller is reset immediately. However, in order to gradually change the echo in an auditory sense, the filter coefficient in the adaptive filter may gradually be decreased to zero.

The entire disclosure of Japanese patent application No. 2009-286504 filed on Dec. 17, 2009, including the specification, claims, accompanying drawings and abstract of the disclosure, is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. An echo canceller comprising an adaptive filter for using a receiver signal to generate a pseudo echo signal, which is used to eliminate an echo component from a transmitter signal, said echo canceller further comprising:
   a specific frequency component eliminator for eliminating a specific frequency component of a specific frequency from the receiver signal to output a resultant signal to an echo path;
   a specific frequency component detector for detecting a frequency component of a substantially same frequency as the specific frequency eliminated by said specific frequency component eliminator from the transmitter signal;
   a noise calculator for finding noise power on a basis of power of the specific frequency component detected by said specific frequency component detector, and finding total power including noise and an echo component on the basis of power of a frequency component including the echo component; and
   a control parameter calculator for using the noise power and the total power found by said noise calculator to find a control parameter of said echo canceller.

2. The echo canceller in accordance with claim 1, wherein the specific frequency is a frequency not causing a near end listener to sense an uncomfortable feeling by a frequency masking effect.

3. The echo canceller in accordance with claim 1, further comprising a timing controller for outputting a timing signal,
   said specific frequency component eliminator including a specific frequency component interrupter operative in response to the timing signal from said timing controller for interruptedly eliminating the specific frequency component from the receiver signal during a first predetermined period at a predetermined time interval,
   said specific frequency component detector including a specific frequency waveform restorer for converting to a signal waveform a frequency component of the specific frequency detected from the transmitter signal,
   said noise calculator being operative in response to the timing signal from said timing controller to treat, as the noise power, output signal waveform power from said specific frequency waveform restorer measured in a period corresponding to the period for eliminating the component by said specific frequency component interrupter, and to treat, as the total power, output signal waveform power from said specific frequency waveform restorer measured in a period corresponding to the period for not eliminating the component,
   said control parameter calculator finding estimated echo power on the basis of the noise power and the total power, and using the noise power, the total power, and the estimated echo power to find a control parameter of said echo canceller.

4. The echo canceller in accordance with claim 3, wherein said specific frequency component interrupter includes:
   a receiver side single component digital Fourier transformer for converting a waveform on a time axis of the receiver signal to a single specific frequency component of the specific frequency;
   a receiver side single component inverse digital Fourier transformer for converting the specific frequency component from said receiver side single component digital Fourier transformer to a waveform on the time axis;
   a data storage for receiving the receiver signal, compensating a processing period for said receiver side single component digital Fourier transformer and said receiver side single component inverse digital Fourier transformer, and delaying the receiver signal; and
   a specific frequency component canceller operative in response to the timing signal from said timing controller for canceling an output signal of said receiver side single component inverse digital Fourier transformer from an output signal outputted from said data storage.

5. The echo canceller in accordance with claim 3, wherein said specific frequency waveform restorer includes:
   a transmitter side single component digital Fourier transformer for converting a waveform on the time axis of the transmitter signal to a single specific frequency component of the specific frequency;
   a transmitter side component storage for holding the specific frequency component from said transmitter side single component digital Fourier transformer during a second predetermined period; and
   a transmitter side single component inverse digital Fourier transformer for converting the specific frequency component from said transmitter side component storage to a waveform on the time axis.

6. The echo canceller in accordance with claim 3, wherein the first predetermined period is longer than a period corresponding to taps of said adaptive filter which correspond to an echo response period.

7. The echo canceller in accordance with claim 3, wherein said noise calculator treats, as a period for measuring the noise power, a period from a starting time of outputting the component by said specific frequency component interrupt responsive to the timing signal from said timing controller until immediately before detecting the positive-going edge of power of the transmitter signal by said specific frequency waveform restorer, and
   said noise calculator treats, as a period for measuring the total power, a period elapsing a time corresponding to the taps of said adaptive filter from the positive-going edge of power of the transmitter signal detected.

8. The echo canceller in accordance with claim 3, wherein said control parameter calculator includes a step gain calculator for finding a step gain of echo path identification algorithm for said echo canceller as the control parameter, and
   said step gain calculator finds a power constituent ratio of the noise power, the total power and the estimated echo power in a component of the transmitter signal,
   said step gain calculator decreases the step gain if it is determined to include a relatively large noise component on the basis of the power constituent ratio, and
   said step gain calculator increases the step gain if it is determined to include a relatively large echo on the basis of the power constituent ratio.

9. The echo canceller in accordance with claim 8, wherein the step gain found by said step gain calculator is represented by an exponential function expression (51) or (52):

$$\alpha = \exp\left\{\left(\frac{P_{sn} - P_n}{P_{sn}} - 1\right)\right\} \tag{51}$$

$$\alpha = \left[\exp\left\{\left(\frac{P_{sn} - P_n}{P_{sn}} - 1\right)\right\}\right]^\gamma \tag{52}$$

where $\alpha$ is the step gain, $P_{sn}$ is the total power, $P_n$ is the noise power, $Pow\_e$ is the estimated echo power, and $\gamma$ is a real number satisfying $0 < \gamma$,
exponential parts of the expressions (51) and (52) being represented by:

$\{(P_{sn} - P_n)/P_{sn}) - 1\} = \{(Pow\_e/P_{sn}) - 1\}$.

10. The echo canceller in accordance with claim 8, wherein the step gain found by said step gain calculator is represented by an exponential function expression (53):

$$\alpha = \frac{1}{e-1}\left\{\exp\left(\frac{P_{sn} - P_n}{P_{sn}}\right) - 1\right\} \quad (53)$$

where α is the step gain, Psn is the total power, Pn is the noise power, and Pow_e is the estimated echo power,
an exponential part of the expression (53) being represented by:

(Psn−Pn/Psn)=(Pow_e/Psn).

11. The echo canceller in accordance with claim 1, wherein said specific frequency component eliminator includes a specific frequency component cut-off section for cutting off the specific frequency component from the receiver signal,
said specific frequency component detector includes a frequency component extractor for extracting a frequency component of the specific frequency and an adjacent frequency component of at least one frequency around the specific frequency from the transmitter signal,
said noise calculator treats power of the specific frequency component extracted by said frequency component extractor as the noise power and power of each adjacent frequency component as the total power, and
said control parameter calculator finds estimated echo power on the basis of the noise power and the total power, and uses the noise power, the total power, and the estimated echo power to find a control parameter of said echo canceller.

12. The echo canceller in accordance with claim 11, wherein said frequency component extractor includes:
a transmitter side single component digital Fourier transformer for converting a waveform on the time axis of the transmitter signal to a single specific frequency component of the specific frequency;
a transmitter side component storage for holding the specific frequency component from said transmitter side single component digital Fourier transformer during a second predetermined period;
one or more transmitter side adjacent component digital Fourier transformers for converting a waveform on the time axis of the transmitter signal to a single adjacent frequency component of a frequency adjacent to the specific frequency; and
one or more transmitter side adjacent component storages for holding the adjacent frequency component from each transmitter side adjacent component digital Fourier transformer during a third predetermined period.

13. The echo canceller in accordance with claim 1, further comprising a timing controller for outputting a timing signal,
said specific frequency component eliminator including a parallel frequency interrupter operative in response to the timing signal from said timing controller for interruptedly eliminating frequency components of a plurality of frequencies different from each other from the receiver signal in parallel during a first predetermined period at a predetermined time interval,
said specific frequency component detector including a parallel frequency waveform restorer for converting to a signal waveform a frequency component of each frequency eliminated by said parallel frequency interrupter in parallel,
said noise calculator being operative in response to the timing signal from said timing controller treating power of the plurality of output signal waveforms from said parallel frequency waveform restorer measured in a period corresponding to the period for eliminating the component by said parallel frequency interrupter as the noise power of the respective frequencies, and treating power of the plurality of output signal waveforms from said parallel frequency waveform restorer measured in a period corresponding to the period for not eliminating the component as the total power of the respective frequencies,
said control parameter calculator finding estimated echo power of the respective frequencies on the basis of the noise power and the total power of the plurality of frequencies, and finding a control parameter of said echo canceller on the basis of a maximum noise power and a maximum estimated echo power among the plurality of frequencies.

14. The echo canceller in accordance with claim 1, further comprising a frequency determiner for determining different frequencies in response to a result of voice activity detection,
said specific frequency component eliminator including a temporally assorting specific frequency interrupter for treating the plurality of frequencies determined by said frequency determiner as the specific frequency to interruptedly eliminate the specific frequency component from the receiver signal for the respective frequencies in an order,
said specific frequency component detector including a temporally assorting specific frequency waveform restorer for treating the frequencies determined by said frequency determiner as the specific frequency to convert to a signal waveform a frequency component of the specific frequency detected from the transmitter signal for the respective frequencies in the order,
said noise calculator treating output signal waveform power from said temporally assorting specific frequency waveform restorer measured in a period corresponding to the period for eliminating the component by said temporally assorting specific frequency interrupter as the noise power, and treating output signal waveform power from said temporally assorting specific frequency waveform restorer measured in a period corresponding to the period for not eliminating the component as the total power,
said control parameter calculator finding estimated echo power in each period of time on the basis of the temporally assorted noise power and the total power, and finding a control parameter of said echo canceller on the basis of a maximum noise power and a maximum estimated echo power in a plurality of periods.

15. The echo canceller in accordance with claim 13, wherein the step gain found by said step gain calculator is represented by an exponential function expression (54):

$$\alpha = \exp\left\{\left(\frac{P_{echo\_max}}{P_{sn\_max}}\right) - 1\right\} \quad (54)$$

where α is the step gain, Psn_max is the maximum total power, Pn_max is the maximum noise power, and Pecho_max is the maximum estimated echo power,
in the expression (54), Psn_max=Pn_max+Pecho_max.

16. The echo canceller in accordance with claim 1, further comprising an echo path variation determiner for determining a variation on the echo path according to a predetermined determination condition on the basis of short-term average power and long-term average power of the noise power and short-term average power and long-term average power of a residual signal from said echo eliminator, said control parameter calculator setting the control parameter so as to quicken convergence of said echo canceller on the basis of a result of determination by said echo path variation determiner when an increase in the power of the residual signal is not caused by the noise other than the echo.

17. The echo canceller in accordance with claim 16, wherein said echo path variation determiner outputs an echo path variation detection flag epc=1 when an increase in the power of the residual signal is not caused by the noise other than the echo, and otherwise outputs the echo path variation detection flag epc=0, and the step gain found by said step gain calculator of said control parameter calculator is represented by an exponential function expression (55):

$$\left.\begin{array}{l} \text{if } epc = 0, \text{ then} \\ \alpha = \exp\left\{\left(\frac{P_{sn} - P_n}{P_{sn}}\right) - 1\right\} \\ \text{if } epc = 1, \text{ then} \\ \alpha = \mu \end{array}\right\} \quad (55)$$

where $\alpha$ is the step gain, Psn is the total power, Pn is the noise power, and $\mu$ is a constant satisfying $1 \leq \mu < 2$.

18. The echo canceller in accordance with claim 1, further comprising:

a signal separator for separating an inputted receiver signal into a plurality of frequency bands, said echo canceller being provided in plural correspondingly to the plurality of frequency bands to eliminate echoes from the plurality of frequency bands separated by said signal separator; and a signal combiner for combining the frequency bands of output signals from said respective echo cancellers to each other.

19. The echo canceller in accordance with claim 8, wherein the step gain is calculated by at least any one of expressions (51), (52), (53), and (55):

$$\alpha = \exp\left\{\left(\frac{P_{sn} - P_n}{P_{sn}}\right) - 1\right\} \quad (51)$$

$$\alpha = \left[\exp\left\{\left(\frac{P_{sn} - P_n}{P_{sn}}\right) - 1\right\}\right]^\gamma \quad (52)$$

where $\alpha$ is the step gain, Psn is the total power, Pn is the noise power, Pow_e is the estimated echo power, and $\gamma$ is a real number satisfying $0 < \gamma$, exponential parts of the expressions (51) and (52) being represented by:

$$\{(Psn - Pn)/Psn) - 1\} = \{(\text{Pow\_e}/Psn) - 1\}, \quad (53)$$

$$\alpha = \frac{1}{e-1}\left\{\exp\left(\frac{P_{sn} - P_n}{P_{sn}}\right) - 1\right\}$$

an exponential part of the expression (53) being represented by:

$$(Psn - Pn/Psn) = (\text{Pow\_e}/Psn), \quad (55)$$

and $$\left.\begin{array}{l} \text{if } epc = 0, \text{ then} \\ \alpha = \exp\left\{\left(\frac{P_{sn} - P_n}{P_{sn}}\right) - 1\right\} \\ \text{if } epc = 1, \text{ then} \\ \alpha = \mu \end{array}\right\}$$

where $\mu$ is a constant satisfying $1 \leq \mu < 2$.

20. The echo canceller in accordance with claim 1, wherein said adaptive filter comprises a pseudo echo generator for using the receiver signal to generate the pseudo echo signal, said echo canceller further comprising an echo eliminator for using the pseudo echo signal to eliminate the echo component from the transmitter signal.

* * * * *